(12) United States Patent
Hisano et al.

(10) Patent No.: US 7,451,126 B2
(45) Date of Patent: Nov. 11, 2008

(54) STATE SPACE NAVIGATION SYSTEM, USER SYSTEM AND BUSINESS METHODS FOR MACHINE TO MACHINE BUSINESS

(75) Inventors: Atsushi Hisano, Arlington Heights, IL (US); Shigeko Otani, Fremont, CA (US)

(73) Assignee: Omron Corporation, Kyoto-Shi (JP)

( * ) Notice: Subject to any disclaimer, the term of this patent is extended or adjusted under 35 U.S.C. 154(b) by 1115 days.

(21) Appl. No.: 09/978,788

(22) Filed: Oct. 18, 2001

(65) Prior Publication Data

US 2003/0101154 A1    May 29, 2003

(51) Int. Cl.
  *G06N 5/00*    (2006.01)
(52) U.S. Cl. .......................................... 706/50; 706/45
(58) Field of Classification Search ................... 706/50; 60/773; 348/308; 600/365; 700/30; 250/234; 701/29
See application file for complete search history.

(56) References Cited

U.S. PATENT DOCUMENTS

| | | | | |
|---|---|---|---|---|
| 5,936,858 A | * | 8/1999 | Arai | 700/30 |
| 6,420,698 B1 | * | 7/2002 | Dimsdale | 250/234 |
| 6,572,545 B2 | * | 6/2003 | Knobbe et al. | 600/365 |
| 6,643,569 B2 | * | 11/2003 | Miller et al. | 701/29 |
| 6,768,515 B1 | * | 7/2004 | Erten et al. | 348/308 |
| 6,823,675 B2 | * | 11/2004 | Brunell et al. | 60/773 |
| 2002/0193920 A1 | * | 12/2002 | Miller et al. | 701/29 |

* cited by examiner

*Primary Examiner*—Wilbert L Starks, Jr.
(74) *Attorney, Agent, or Firm*—Foley & Lardner LLP

(57) ABSTRACT

The objective of this invention is to provide a system which could make general use of a large set of previously accumulated knowledge data and provide an optimal solution for a problem based on these knowledge data. To achieve the aforesaid objectives, this invention uses state space navigator logic. The fundamental capability of a state space navigator is finding the optimal route in a state space to get from the current state to the target state. A state space is a space whose axes are a number of state variables. The points in this space represent the characteristic states of a system. The actual action from a state space to the next state space is determined according to the knowledge data base which was made based on an actual experience etc.

14 Claims, 26 Drawing Sheets

STATE SPACE NAVIGATION SYSTEM, USER SYSTEM AND BUSINESS METHODS FOR MACHINE TO MACHINE BUSINESS

FIELD OF THE INVENTION

This invention concerns a scheme for making use of a data base consisting of a vast amount of knowledge data accumulated about an object (which may be a device, a person, the natural environment or some other object). By taking advantage of an information network such as the Internet and etc., this scheme can provide a variety of services, including oversight, diagnosis, data display, control, instructions for service, and authentication etc. The invention also concerns a business model employing a device used to execute this scheme for making use of a data base, a system consisting of this device and the user's system, and a system to make use of the knowledge. With this invention, then, empirical data accumulated from providers and knowledge data developed by system managers themselves are saved in a data base. Users are able to use the existing knowledge data stored in the data base to create a system of their own which is highly efficient. The invention also concerns a system that makes use of data to provide both hardware and software service so that the user can set up his own system cheaply and quickly, or so that a system which fulfills the needs input by the user can be set up automatically. This invention also concerns a system to make use of data which, in addition to the functions described above, can mediate the exchange of data between individuals connected to a network and allow external providers who furnish application software or knowledge data to our device to collect usage fees from any individuals who make use of that software or data.

BACKGROUND OF THE INVENTION

As the information network has mushroomed in recent years, large numbers of terminals with the capacity to transmit information have come to be connected to each other via servers which either accumulate or exchange data through the network. One example of this is home security systems, in which a house is connected on line to a security office which can offer, based on sensor data, either simple surveillance or a higher level of control service. In existing control services, however, when the sensor data assume some specified state, the server is not always able to determine accurately from past data what action should be taken. For example, when a sensor transmits a signal representing detection of an object and location of that sensor, at what point should the server request that the security company send someone out, or contact the police rather than the security company? Questions like these cannot be determined very well based only on the past data stored in the security company's server. Furthermore, when data about past experiences are used for a current situation, they are only effective under specific limit conditions which do not always match those of the actual situation. It is thus difficult to make good use of the stored data. For example, the signals from sensors installed in people's homes, as discussed above, will be affected by what type of sensor it is and by how it is mounted. In order to use previous data effectively and accurately, we need sensor data which are not affected by the condition of the sensor. Currently, no one has a method to accumulate data from which the effects of the various states of the sensors have been removed, and there is no information processing system which uses such data.

Furthermore, in the example of the home security system given above, the sensors are installed in various ways. This makes it extremely difficult to use previous data as it is for a data base, since they consist of raw sensor data accumulated under different conditions. If these data are used, their accuracy remains in doubt. In current systems, a skilled person must test the sensors at the start-up, which rules out the difficult start-up.

Japanese Patent publication 11-327639 proposes a system which selects an optimal route for a robot or navigation system, etc. at the point of design. The system chooses the optimal route between two states, which may be states not yet established or even thought through, so as to avoid faults while fulfilling conditions previously established in the data. This system has a unit to watch for obstacles, which, whenever it detects a new obstacle, adds it to the existing data while continuing to attend to it. In this way it can determine the optimal course of movement at a given moment based on the most recent limit conditions, allowing it to revise what the robot's next movement will be in the process of choosing its course. In such systems, however, the type of sensors used to watch for obstacles and the conditions under which they are installed vary from system to system. For this reason the idea of standardizing the output values of the sensors and making use of previously accumulated data has not been considered, and there are no systems which can use existing data effectively.

The problem of optimization described above is addressed in Japanese Patent Publication 2000-222377, which provides a means to conduct an efficient search for an optimal value without regard for local variations in cost function. Such a system calculates the cost functions and the actual frequency of coordinate values. Then, based on these frequencies, a selection unit chooses the optimal candidate. Since this system limits itself to a method for searching a coordinate space in order to optimize estimated values in this space, it does not provide a technique to move an object from its current position to a desired target position.

Japanese Patent publication 10-307979 provides a system to be used in a security system in which a device contacts a security office using a phone line. This system changes the phone number for calls from outside the security zone. Japanese Patent Publication 2000-207318 discloses a system which allows a service company to limit, at their discretion, the data clients send them so as to prevent information not needed for maintenance from being transmitted. Japanese Patent Publication 11-178076 discloses a system that allows the user to dynamically customize his data line. This system integrates provision of service and ongoing management of operation through a data communication network or a surveillance control network at the level of both phone and data lines, and it makes managing the execution of designs and ongoing operations more efficient.

However, none of these systems has a scheme to make use of previously accumulated data. The system architecture is finalized as far as possible when the system is conceptualized. Setting up such a system thus requires a great deal of time, and once set up, the system has no capacity to make effective use of invaluable empirical data that were accumulated in the past.

Japanese Patent Publication 11-252670 discloses a remote surveillance system using the Internet and sensor terminals. In this system, every sensor belonging to a terminal installed in a plant executes a specific processing routine when a given set of conditions is met. However, due to the various characteristics of these sensors and the way they are installed, the sensors are not always operating under uniform conditions, so their output values are non-identical. The system offers no way to standardize the output values so as to universalize previous data in order to make further use of them. Similarly, Japanese Patent Publication 8-292059 discloses a means to begin to guide someone in a vehicle to quickly search out the optimal route when it becomes necessary to search a route while moving. In this case, a GPS receiver is used to figure out the current position; but no thought was given to standardizing the output signal, since there is only one GPS system in the world.

So even though a great many empirical data are stored in a given server, as described above, they can indicate what action is to be taken only under certain specific conditions. It is rare that the actual circumstances under which different systems were used would match perfectly, and the problem of different circumstances remains. It is therefore not at all easy to use previously accumulated data as a basis to find the correct series of actions to execute in order to move optimally from the current phenomenon to a target phenomenon that is a solution to a given problem.

The great many empirical data mentioned above is used only under comparatively limited conditions, and they are not always used efficiently enough. And since no arrangement exists that would allow a second party to make effective use of someone else's data, it is difficult even to accumulate data efficiently.

SUMMARY OF THE INVENTION

The first objective of this invention is to provide a system which could make general use of a large set of previously accumulated knowledge data and provide an optimal solution for a problem based on these knowledge data.

The second objective of this invention is to provide a system to make use of knowledge which could, at each step of the solution, provide a response which is most relevant at that step.

The third objective of this invention is to provide a system to make use of knowledge which, when accumulating knowledge data, could employ a sensing model to convert the data to a universal state variable which is not dependent on what model of sensors are used, for example, to detect the phenomena or how they are installed. A quantity of knowledge data could then be accumulated based on this universal state variable.

The fourth objective of this invention is to provide a system to make use of knowledge in which the user could easily install the sensors to detect the phenomena, and etc.

The fifth objective of this invention is to provide a system to make use of knowledge such that a second party could make use of previously accumulated data, a system whose reliability would be insured by arranging for a great quantity of data to be recorded. This would be done by insuring that whenever data were used, the person who contributed those data would receive a specific monetary reward.

The sixth objective of this invention is to provide various business models which would employ the aforesaid system to make use of knowledge.

To achieve the aforesaid objectives, this invention uses state space navigator logic. The fundamental capability of a state space navigator is finding the optimal route in a state space to get from the current state to the target state. A state space is a space whose axes are a number of state variables. The points in this space represent the characteristic states of a system.

To explain the basic features of the invention in a comprehensible way, we shall use the example of an electric rice cooker. It should go without saying that the invention could also be applied in a larger and more complex system than a rice cooker.

FIG. 1(a) is a simple diagram of knowledge application system 1, a system to control a rice cooker in order to produce perfectly cooked rice. FIG. 1(b) shows the ideal sequence for the actual control process using a state route map.

Knowledge application device 100 uses a sensing model to convert sensor data from the rice cooker to a state variable, which is generalized data representing the state of a phenomenon without reference to the sensing method employed. By accessing the internet and writing the value of this state variable and the result of comparing it with a reference value into a designated file in a web server where they can be read, we can create a universal remote monitoring system which allows the user to oversee the state of the rice cooker from any location. With the help of the knowledge application device, cookers which lack automatic control systems are easily converted into automatically controlled cookers. The purchaser of a rice cooker need only input the model number of his cooker into a control terminal to convert it to an automatic device whose data can easily be employed.

The user, in other words, uses the internet to convey the data representing the model number of his rice cooker to knowledge application device 100. The knowledge application device provides data concerning the devices which are needed to convert the rice cooker into an automatic device: a controller for the gas flow, a temperature sensor, a pressure sensor and a steam escape valve. The user may then order and purchase the necessary items through the knowledge application device. When the user has acquired all the components he needs to convert his rice cooker to an automatic device, he once again inputs the model number into control terminal 1060. The knowledge application device provides him with instructions for installing the items he has purchased and connecting his rice cooker to the control terminal. These instructions are displayed on the screen of the control terminal. If the instructions on the screen prove insufficient, the user can take advantage of the TV camera and microphone provided with the control terminal to show the rice cooker and the components he must install on it to a serviceman in another location. The knowledge application device can use the internet, then, to set up a communications link between the serviceman's terminal and the aforesaid control terminal so that the user can receive remote help.

We shall explain shortly the actual details of how the aforesaid automatic control of the rice cooker is brought about. As has been discussed, when the knowledge application device related to this invention is connected, a previously determined automatic control scheme for the rice cooker is activated. The user merely inputs into the control terminal the desired state of the rice (for example, "fully cooked"), and the process begins.

Various control terminals 1060 belonging to numerous users will be connected via the internet to the knowledge application device 100 of this invention, which will be located in a surveillance center; and various gas rice cookers 1011, the devices being controlled, will be connected to these terminals. Control terminal 1060 continuously transmits data from pressure sensor 1032 and temperature sensor 1031 on gas rice cooker 1011 to knowledge application device 100. In the data base of knowledge application device 100 are stored the knowledge data required for the control process: how to adjust gas flow control 1041 and steam escape valve 1042; what values are needed for temperature and pressure and how long it will take to attain them; and how long they must be maintained.

The state route map in the example consists of a two-dimensional space with the pressure V on the vertical axis and the temperature T on the horizontal axis. It shows a region for each of state zones S1 through S8 as well as an arc (indicated by an arrow) from each state to one or more other states. The arcs represent the concrete actions taken to move from one state to another. These actions are stored as knowledge data for the process in the data base of knowledge application device 100. The state route map also indicates danger zones which must be avoided. In this example, these danger zones are the regions where the rice is undercooked or burned.

Let us assume that someone has entered into the data base knowledge data that will allow the control process to proceed from S1 to S8 to produce perfectly cooked rice. Let us also assume that the state zones S1 through S8 entered by this person are defined as follows.

S1: Rice has not yet begun to cook.
S2: Rice has just begun to cook.
S3: Rice is cooking rapidly over a high flame.
S4: Rice is cooking moderately over a high flame.
S5: High temperature is maintained.
S6: Low temperature is maintained to cook rice rapidly.
S7: Low temperature is maintained to cook rice moderately.
S8: Temperature is maintained after cooker is opened.

When the rice begins to cook, it moves from S1 to S2 through the concrete actions represented by arc [1, 2]. The know-how needed to adjust gas flow control 1041 and steam escape valve 1042 on rice cooker 1032 is stored in the knowledge data base in knowledge application device 100. Similarly, action arc [2, 3] to move from S2 to S3, rapid cooking, and action arc [2, 4] to move to S4, moderate cooking, are stored in the knowledge base. Thus until we reach the target state zone, S8, each state zone is linked to various other state zones by these arcs. The only knowledge discussed in the diagram is that needed to go from rapid cooking to moderate cooking; the data base could naturally contain other knowledge as well. Knowledge might be added, for example, to cook hard or soft rice. In that case the rice might have to pass through other states in addition to or instead of state zones S1 through S8. We might, for instance, establish a state zone S9 near S2 in order to cook mushy rice and a state zone S10 to cook hard rice. A great variety of knowledge, then, would be stored in knowledge application device 100 in order to be able to achieve various purposes. Someone using this knowledge later on who wants to, say, cook his rice quickly, could click on any state zone up to S6 (maintain temperature for rapid cooking), the final state zone on the state route map displayed on the CRT and etc. Then by selecting an estimation function to choose an actual arc (cook the rice quickly, cook the rice slowly, etc.), the user can easily make use of the available knowledge data to perform the desired process.

When a large set of knowledge data is stored in designated server 100, a third party can easily access and make use of this knowledge using the knowledge application system related to this invention. Attribute values for each action arc are input into a route estimation function and a search is conducted for the most appropriate route, leading to the designation of which arcs are to be used. If we use the example discussed above, the user has requested that the rice be cooked as quickly as possible. Using the element of time to choose an arc estimation, we end up selecting the route S1-S3-S5-S6-S8 to control temperature and pressure. The distinguishing feature of this invention is that it allows the various states to be specified not in terms of substantiated data points, but as ranges which can converge. In other words, the invention allows feedback control, which is expressed as a state route map linking regions that are actually microcontrollable ranges. The resulting state route map, then, will not be a narrow one linking single points in an appropriate range, but a more general-purpose one. Thus it can be reused later for a wide range of applications.

In the knowledge application system 100 of this invention, knowledge data acquired in the past are not constructed as knowledge from a sensor with specific characteristics, and the output from specific sensors is not used as raw data. Rather, using the sensing model related to this invention, these data are converted to universal data. A third party user at some later date with the same system but different sensors with different characteristics will be able to use the same stored knowledge.

Thus with the knowledge application device and system according to this invention, a user who himself has no special knowledge can design an efficient system using the extensive know-how stored in the knowledge application device.

Since the person who enters the knowledge grants permission for a third party to reuse the knowledge data at some later date, that person will receive remuneration when his data are used, while the user will be assessed a usage fee. In this way knowledge application device 100 can construct a system in which a great many knowledge data are stored, all of which have the potential to earn usage fees at a later date.

The knowledge application device and system according to this invention are, of course, not limited to the remote control of a rice cooker, as described above. They could also use sensor data to oversee, control or diagnose any type of device in the home or workplace, or to apply the extensive knowledge data it has accumulated to oversee, control or diagnose equipment etc. at indeterminate locations such as work sites or markets, based on sensor data sent via the internet.

DETAILED DESCRIPTION OF THE INVENTION

Before we discuss the system to make use of knowledge related to this invention, we need to explain the state space navigator which furnishes the conceptual basis for the invention.

1. The Concept of a State Space Navigator 1.1. Definitions of Terms

Figure 1:
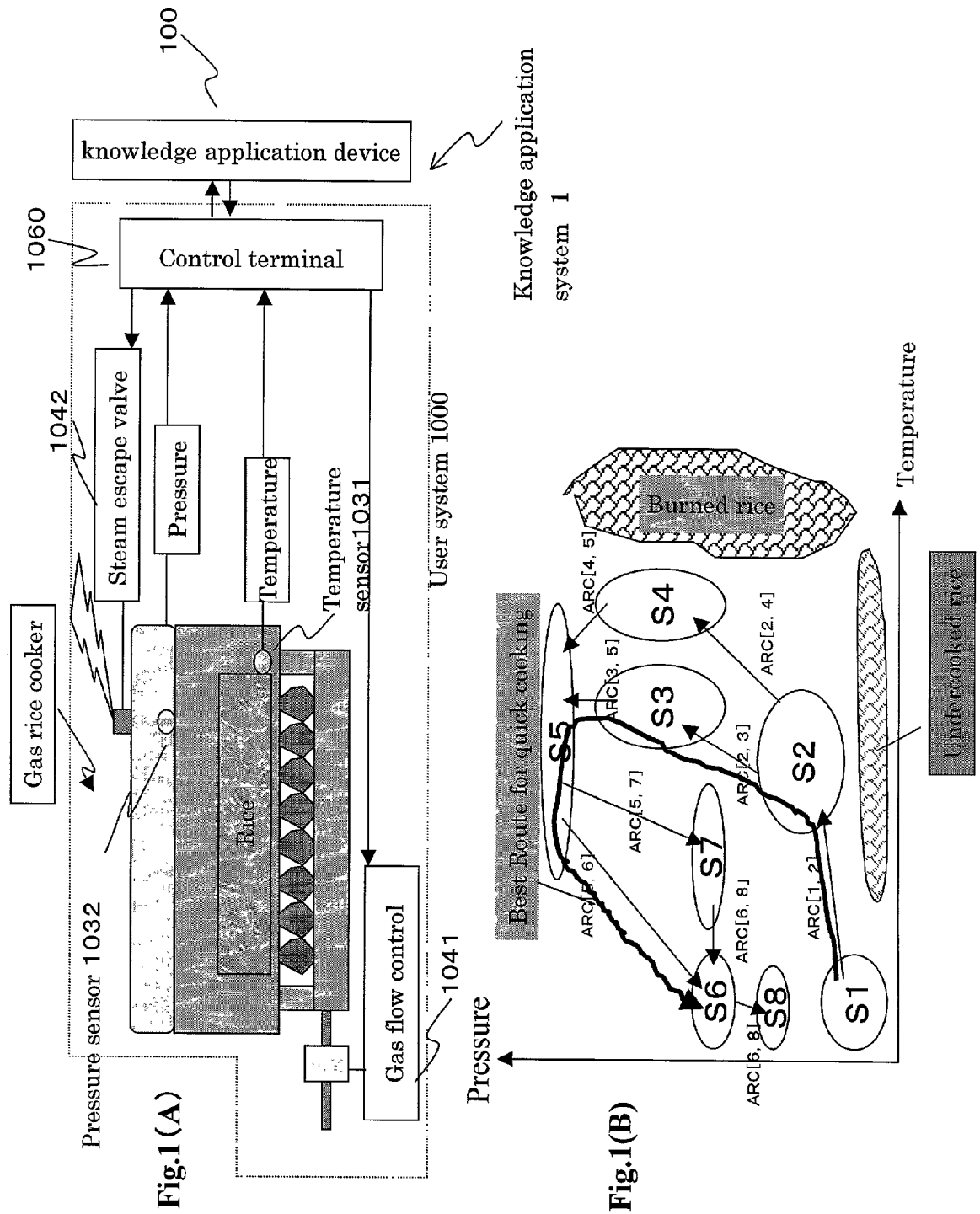
FIG. 1(A) illustrates is a simple diagram of knowledge application system 1, a system to control a rice cooker in order to produce perfectly cooked rice.
FIG. 1(B) illustrates the ideal sequence for the actual control process using a state route map of control states.
Figure 2:
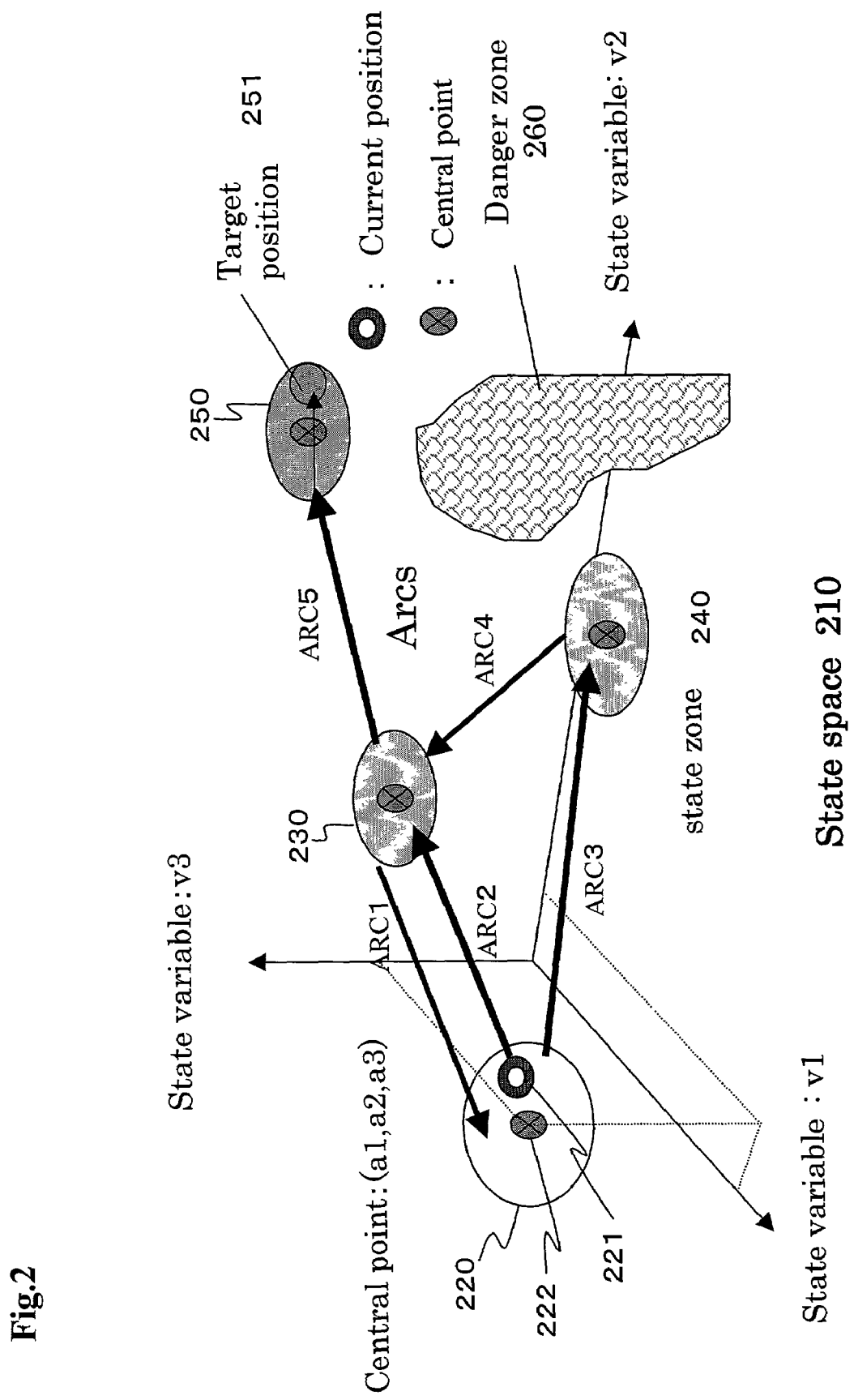
FIG. 2 illustrates a rough sketch illustrating the basic features of state space navigator 200, which is used in the system to make use of knowledge according to this invention.

FIG. 2 is a rough sketch illustrating the basic features of state space navigator 200, which is used in the system to make use of knowledge according to this invention. In this section we shall explain the main terminology used in regard to this invention.

1) State space: As can be seen in FIG. 2, a space such that state variables which represent the state of the system consist of vectors. In a given system, the current position, danger zone and target position and etc. are all within that space.
2) State variables: Variables which represent the state of the system. Ordinarily, state variables would include the outputs of the sensors conducting the surveillance, their derivations, their time averages, and a function whose input is the output of multiple sensors, etc.
3) State position: A set of state variable values which represents the state of the system in a state space that can be represented as actual values of state variables. A state position represents a single point in the state space.
4) State zone: In contrast to representing the state of the system at a point, the state zone is a region with a boundary surface. It is used to indicate a route in the state space. A state zone has a center point which can serve as a focal point. The region that consists of any current position, which has this center point as it focus, is a state zone.
5) Center zone: A set of points in a state zone which can be made to converge from an arbitrary point in the state zone by feedback control. The center zone contains the center point.
6) State route map: A map which shows state zones and arcs indicating movement from one state zone to another. An object at any arbitrary point in a state zone is moved to the center point of that state zone by feedback control and from the center point to the desired state zone through the use of the knowledge base stored in the device to make use of knowledge.
7) Arc: A series of moves to go from one state zone to the next.
8) Action: An actual move within an arc determined by using the knowledge base. An arc, in other words, consists of three movements: the movement, using feedback control, from the current position to the center point of the state zone in which the current position lies; the movement to the next state zone; and the movement from that position to the center point of that state zone.
9) State space navigator: A concrete device to move an object in a state zone according to a state route map.
10) Knowledge data: User information, previously established empirical data, state route maps, etc. which are stored in the knowledge application device of this invention.
11) Sensing model: A means to obtain a state variable from the output signals of sensor by removing the effects of the characteristics, locations, and other conditions of the sensors in different users' systems.
12) Knowledge application device: The fundamental concept underlying this invention. A concrete device which can make use of knowledge based on a state route map.
13) Request: An instruction from a user's system specifying certain processing to the knowledge application device of this invention. A request does one of the following.
    1) Specify a target state.
    2) Select a standard by which to evaluate the route to the target state (Select an evaluation function).
    3) Indicate a program which must be executed.
    4) Obtain detection of the current position and the output representing the result of the detection (Request surveillance).
    5) Request output representing result of diagnosing current state by some specified scheme (Request diagnosis).
    6) Obtain a second search for the optimal route to a target state (Request second search).
    7) Request to oversee terminal control device or knowledge application device.

1.2. The State Space

Figure 9:
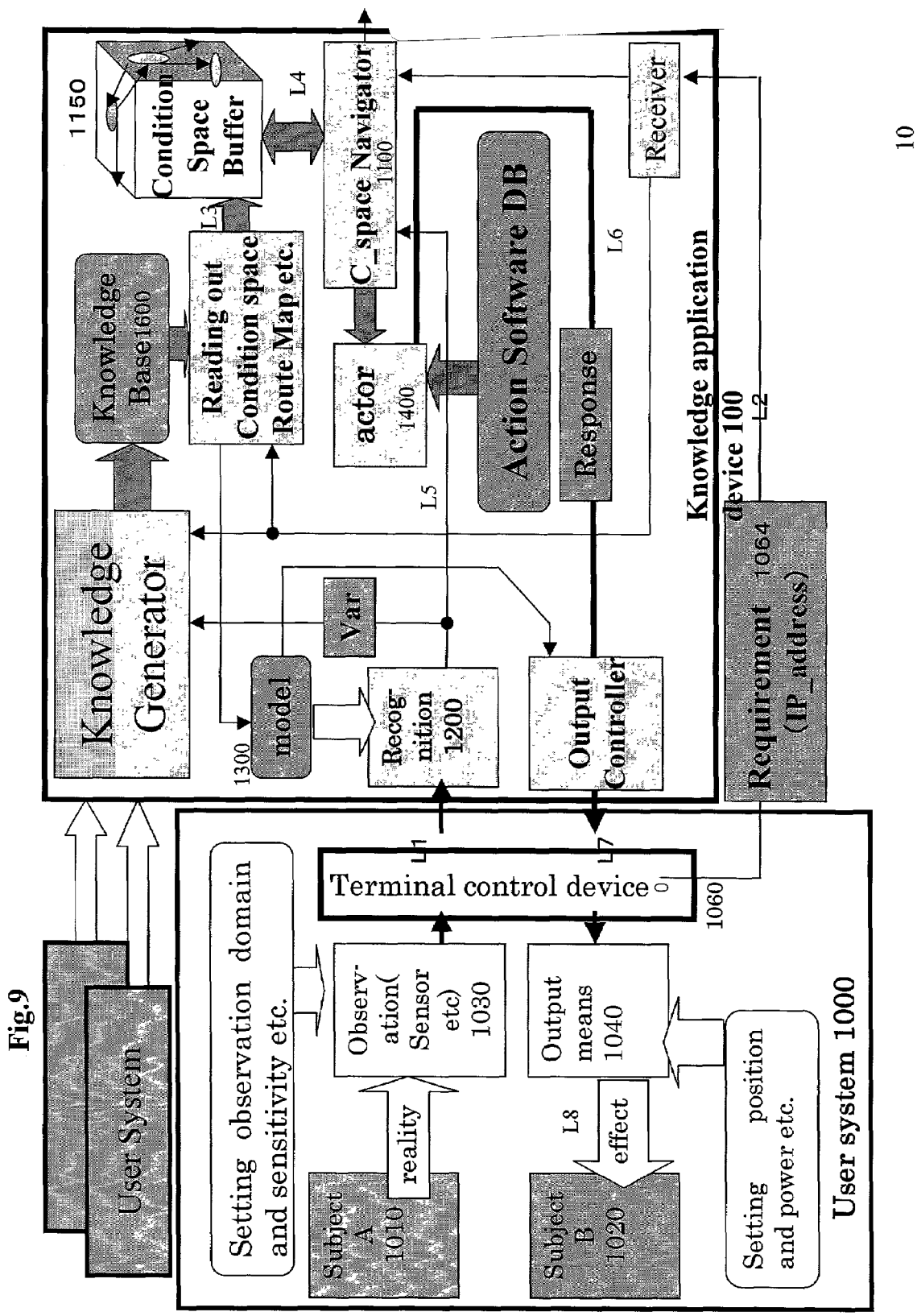
FIG. 9 illustrates a total configuration of the knowledge application device according to this invention.

State space navigator 1100, which is shown in FIG. 9, has the basic function of conducting a search for the optimal route in the state space 210 shown in FIG. 2 from current state 221 to target state 251, and then designating that route. We shall begin with state space 210. A state space consists of state variables which are used as spatial axes. The points in a space indicate the specific states of a system. In FIG. 2, for example, there is a three-dimensional space consisting of specific state variables v1, v2 and v3. All three states are represented as locations in this three-dimensional space. The state variables consist of signals obtained from sensors monitoring a system. These signals are processed, using a sensing model which will be described shortly, to remove the effect of what type of sensors were used or how they were mounted etc., and they are converted into values representing the state of the system. For example, let us say that v1 is the temperature detected by a heat sensor, v2 is the pressure detected by a pressure sensor, and v3 is the acceleration detected by an acceleration sensor. (However, state variables are not limited to raw sensor data as above. v1 could also be processed data, such as rate of temperature change, derived from the raw data.) In state space 210 there are five state zones, 210, 220, 230, 240 and 250; and five arcs between state zones, ARC 1 through ARC 5. The arcs have a given direction. The current position may be anywhere in the state space.

1.3. Internal Configuration of a State Zone

Figure 3:
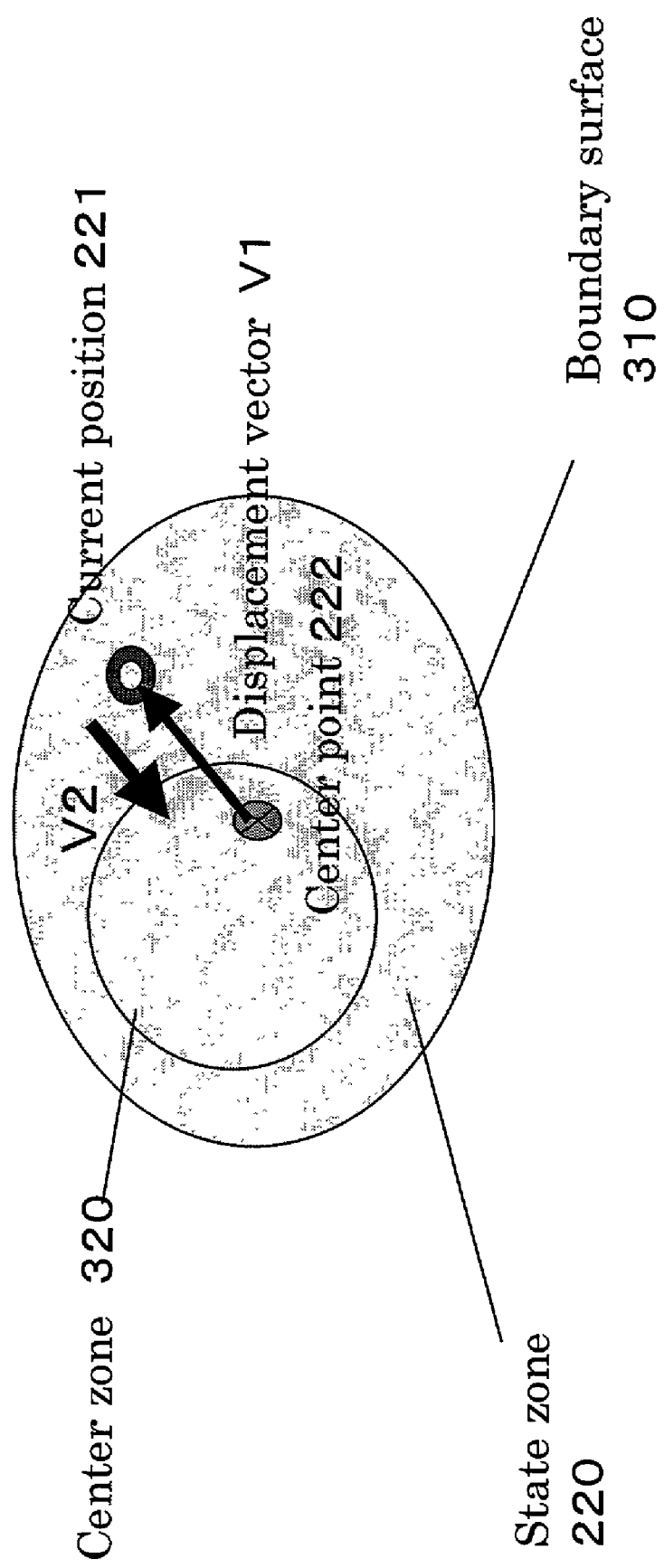
FIG. 3 illustrates an internal configuration of state zone.

The internal configuration of state zones 220 230, 240 and 250 shown in FIG. 2 is illustrated in FIG. 3, using state zone 220 as an example. State zone 220 is an enclosed region with a boundary surface 310. It has a center point 222, which can be converged on from current position 221. "Convergence" here refers to using displacement vector V1, looking from center point 222 toward current position 221, as a reference for feedback control of position 221. In other words, convergence refers to the displacement in state zone from current position 221 in the direction of vector V2. To put this another way, the maximum range in which current position 221 can be converged on center point 222 is defined by the boundaries of state zone 220. Center point 222 is not always a fixed point in state zone 220. It may be anywhere in center zone 320. The location of the center point may change to reflect the result of displacement into a different state zone or to represent one of a set of such points. If current position 221 is outside the boundaries of state zone 220, it can no longer be converged on center point 222. We define state zone 220 in this way so that it can be used to show the routes in state space 210. If the state zone were not fixed in the state space, any knowledge indicating routes within the state space based on that zone would be useless, and there would be no cumulative results. The arcs from center point 222 to the center points of other state zones constitute the resulting knowledge data.

As was described above, there is a center zone 320 inside state zone 220. Center zone 320 consists of a set of points in the state zone which can be converged on by feedback control from an arbitrary point in the state zone. As should be clear from this definition, the center point of the state zone is in center zone 320.

The reason we move in this way from current position 221 and converge on center point 222 is that the current position and the starting point used to accumulate the empirical data, i.e., the point defined by the knowledge data, namely, center point 222, are normally in two different places. It is, therefore, necessary to move current position 221 to center point 222 to make use of universal empirical data in the individual system.

As can be seen in FIG. 2, state space 210 also contains an extremely dangerous area, danger zone 260. This area might be one that would cause the system to be destroyed if an object got into it. It might be an area that is too hot or one where there is so much vibration that an object's components are liable to be broken apart. Another possible danger zone would be one in which remote operation could cause a pressurized spring to suddenly expand. Unless such danger zones are exited quickly or avoided entirely, the system may be destroyed or things that are near it may be severely damaged. Thus arcs 1 through 5, which are made up of actual actions taken to move an object from one state zone to another, must avoid danger zone 260.

1.4. Integrating State Zones

Figure 4B:
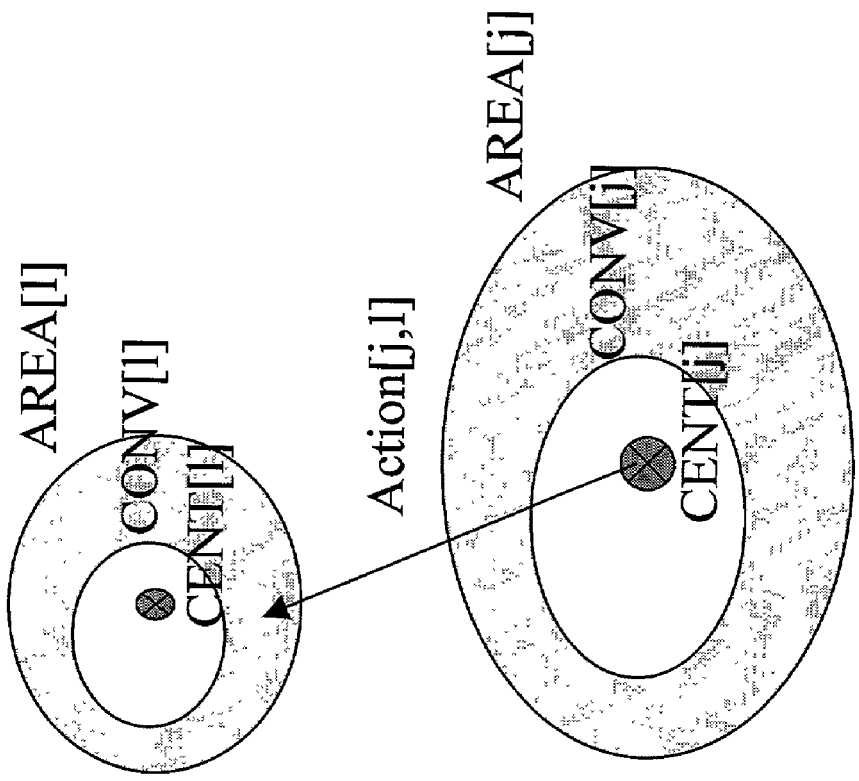
FIG. 4 illustrates the basic concept of integrating the aforementioned state zones.
Figure 4A:
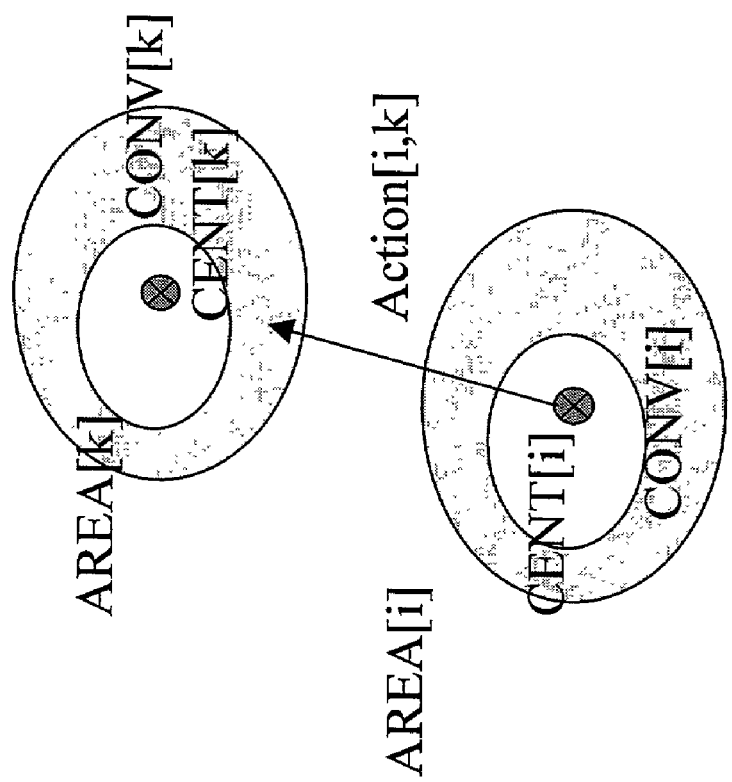

FIG. 4 illustrates the basic concept of integrating the aforementioned state zones. To enhance the universality of state route maps and allow a great deal of knowledge to be combined, state zones which it is possible to integrate must be integrated. State zones can be integrated by the knowledge application device or by a separate computer which manages the knowledge data. When we speak of "integrating" state zones with respect to state route maps, we refer to synthesizing knowledge contributed by a large number of people.

To give an example, state zones AREA [i] and AREA [j] can be integrated by establishing either condition (a) or condition (b).

(a) If CONV [i] is comprehended within CONV [j], and a movement from CENT[i] toward AREA [k], the destination of the desired arc from CENT[i], can, in an experiment, be completed successfully in a stable fashion from CENT[j], then the two state zones can be integrated so that only AREA [j] remains.

(b) If AREA [i] is completely comprehended within AREA [j], and CENT[i] is so close to CENT[j] that they may be considered to be the same location, then the two state zones can be integrated so that only AREA [j] remains. This case is based on the premise that a slight error may be ignored.

1.5. Arcs

Figure 5:
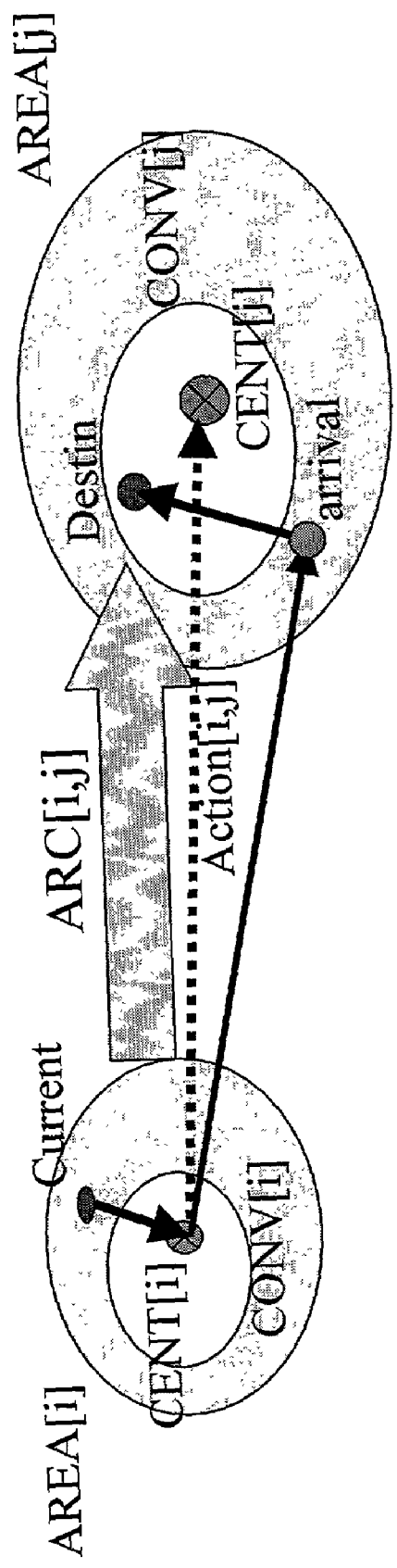
FIG. 5 illustrates the basic concept of the aforementioned arc.

FIG. 5 illustrates the basic concept of the aforementioned arc. For this explanation, we need to define the following terms.

AREA [i]: The "i"th state zone
ARC [i,j]: The means to move from somewhere in AREA [i] to CONV [j]
BORD [i]: AREA [i]'s boundary surface
Current: The current position (i.e., the current state)
CENT[i]: The center point of AREA [i]
Destin: The target position (i.e., the target state)
CONV [i]: AREA [i]'s center zone
Action [i,j]: The action which must be executed to move from CENT[i] to CENT[j]

Any point in AREA [i] can be moved to a point in center zone CONV [i], which contains center point CENT [i]. If we have a means to move at least one point in CONV [i] to at least one point in AREA [j], we then become able to move any point in AREA [i] to any point in CONV [j]. Here Action [i,j] is stored as an empirical means to move a state from CENT [i] to CENT [j]. If we extend the range of both the starting point and destination of Action [i,j], we increase its universality. In this way two state zones are connected to each other by an arc. Since the actions which link the two points, which are in the form of empirical data that result when we move from CENT [i] to CENT [j], can be used to move between two zones which are even larger than points [i] and [j], the empirical data can have an even greater range of applicability.

ARC [i,j], i.e., the arc which is the means of moving from AREA [i] to CONV [j], can also be expressed as the following formal rule.

IF Current is inside of AREA [i] & Destin is inside of CONV [j] THEN ACTOR=(Goto CENT [i] form Current, Action [i,j], and Goto Destin from arrival in AREA [j])

That is, if the current position (Current) is within the state zone called AREA [i], and the destination (Destin) is within Conv [i] (in other words, if the current position is somewhere in AREA [i] in the range where feedback control can be exercised), then the actor moves from its current position to the center of [i] (CENT [i]) and from there to the center of [j] (CENT [j]) in Action [i,j]. Because the Action [i,j] which results is not limited to the precise conditions that applied here, its endpoint can be treated as an arrival. From this arrival, the actor can be moved along a route to its destination. This is how the arc [i,j] related to this invention is defined.

Ordinarily, an action accomplished by an arc would be one which changed the state of a system by acting on it. However, in some cases, like the one shown in FIG. 6, an action may be caused in a system by another system acting on it. For example, consider a system B. which supplies raw materials to a system A. An action which issues a command to increase the speed at which system B supplies materials might be inserted in an arc in the state space of system A. In this example, the action initiated by arc 1 designates the center zone of state zone SB2 in system B as the destination (designation A to B). In system B, the state space navigator for B moves the actor from SB1 to SB2. Since a destination in state zone SB2 has been designated, the control necessary for the object to arrive there is executed by system B. System B, by designating a destination in state zone SB2, can execute a B to A operation and cause an actor in a state zone in system A to move from SA1 to SA2. When a destination is specified, the control necessary for the object to arrive there is executed in SA2.

Figure 6:
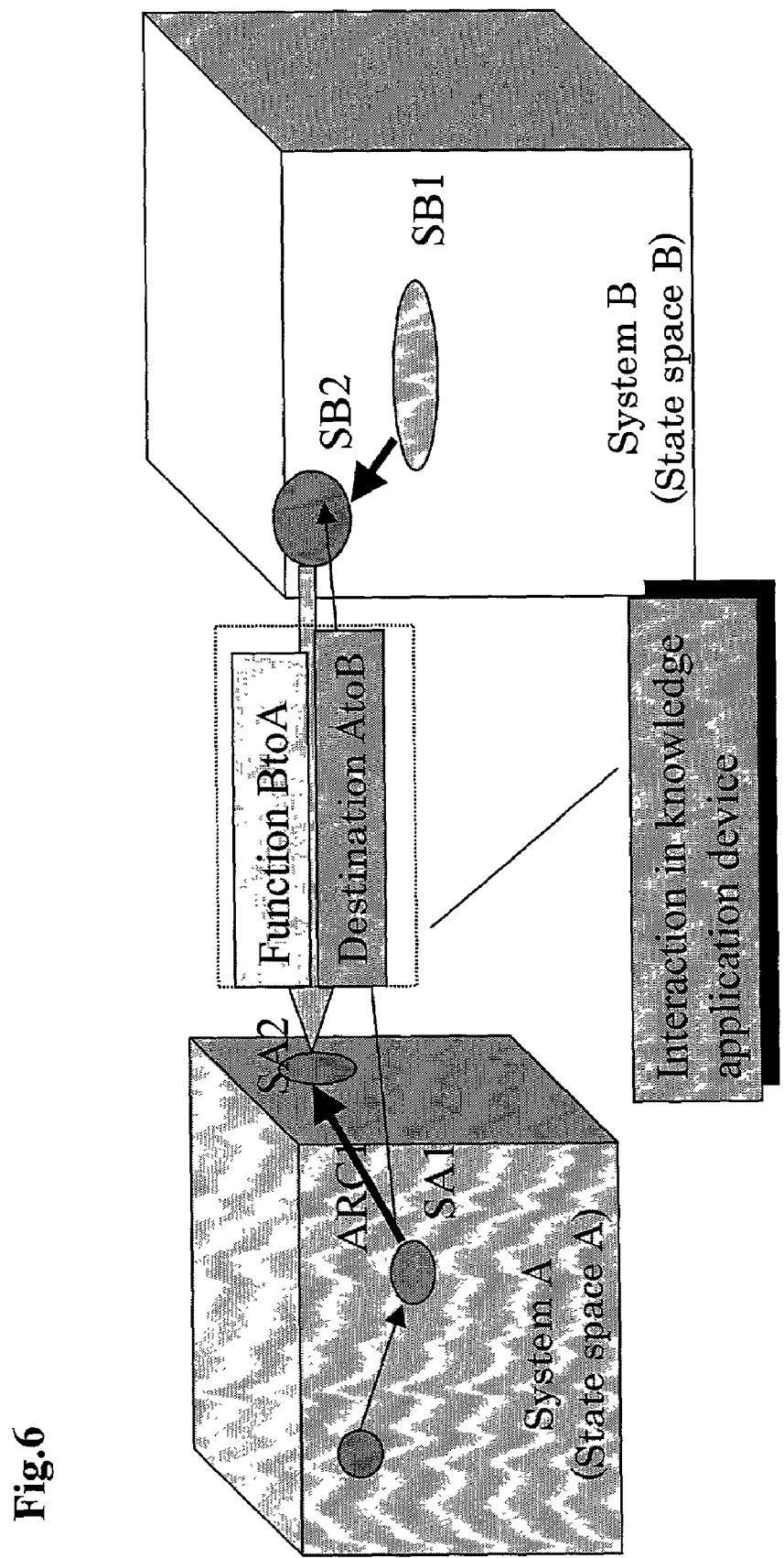
FIG. 6 illustrates the basic concept of the aforementioned arc.
Figure 7:
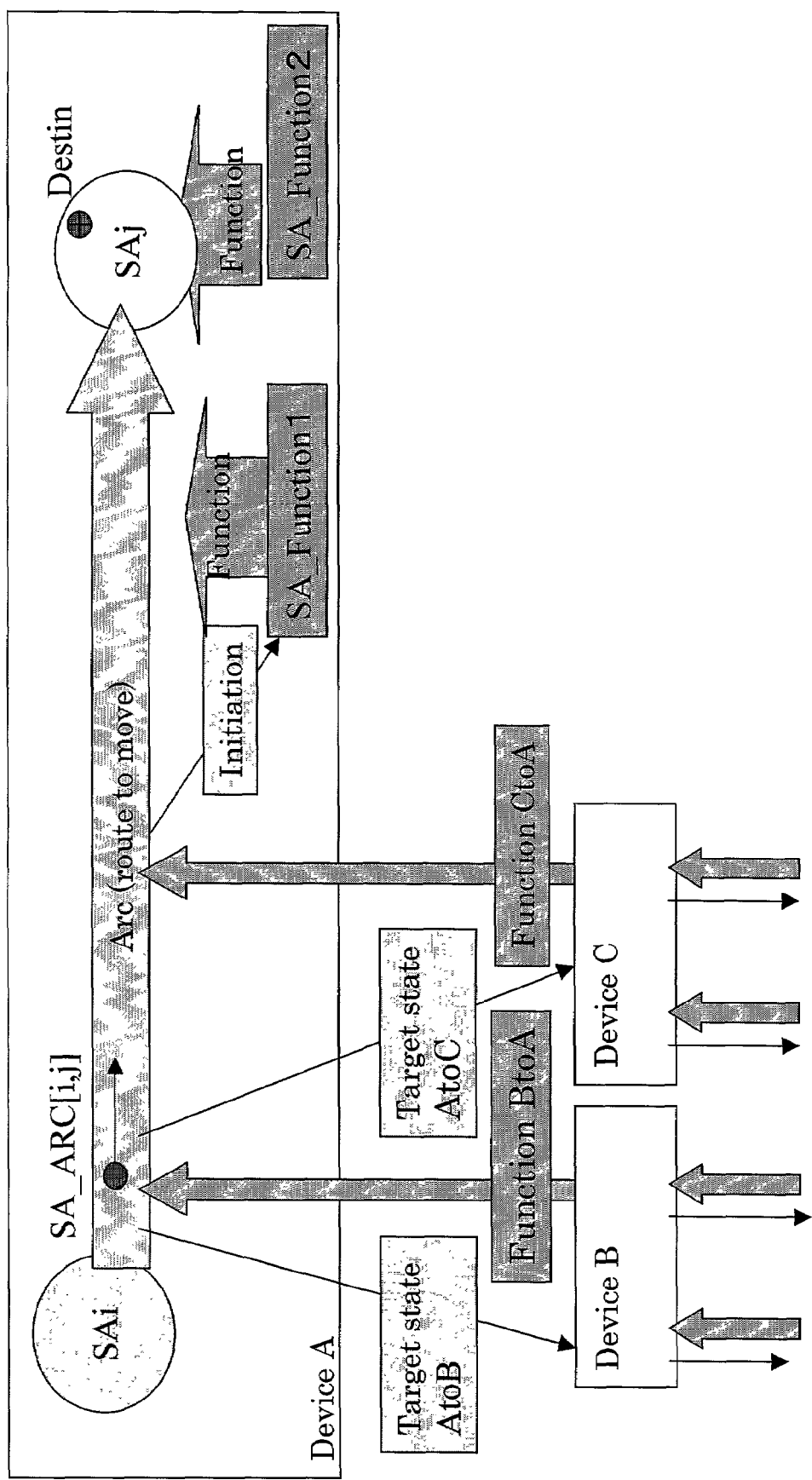
FIG. 7 illustrates the concept of how an action initiated an arc functions to another system.

FIG. 7 shows another example, which is different from the action initiated by the arc in FIG. 6. In the arc-driven action shown in FIG. 6, two modes of action are combined. The actor is first motivated from outside that zone to move within it; the functions within the zone are then employed to move within that zone. An actor can also be motivated to leave a zone by more than one device, such as devices B and C shown in the drawing, to produce the same action. In this case the destinations are indicated sequentially by the external devices. SA_Function 1, an internal function of device A, initiates the movement of the actor in device A's state zone. Once the actor arrives in state zone SAj, SA_Function 2 controls its convergence on the state that is the designated position (i.e., the destination). This scheme is based on the premise that the target state input into device B is one that requires a B to A operation.

Figure 8A:
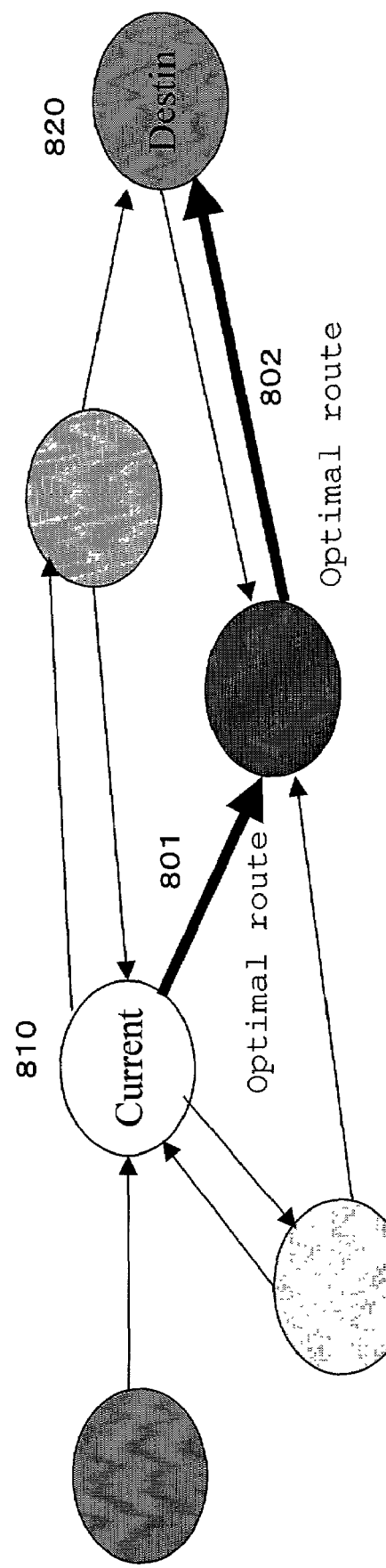
FIG. 8(A) illustrates the concept of how the optimal route is determined on a state route map.

FIG. 8(A) illustrates the concept of how the optimal route is determined on a state route map. The attributes of the various arcs are the key factor in a search for an optimal route in a state space. To search for the optimal route from one state zone to another, the attribute values of different arcs are input into a route evaluation function, and a search is conducted for the route which maximizes the value of that function. In other words, this knowledge system stores all the knowledge it has accumulated in the past as arcs. The problem of which arc to use (i.e., which knowledge to use) to arrive in the targeted state zone is solved by the route evaluation function. The route evaluation function selects, from the various routes (arcs) available to go from current position (Current) 810 to destination (Destin) 820, routes 801 and 802, which minimize the cost involved in the move. Any number of factors can go into the evaluation function. Each user is free to decide on what sort of evaluation function to use for selecting routes.

Examples of Arc Attributes:

(1) Time required for the move (average time, maximum time, minimum time).

(2) Cost of the move (monetary cost, cost in terms of amount of energy consumed).

(3) Probability of success.

(4) Number of external devices used in the move.

For the attributes listed above, users would be likely to choose evaluation functions etc. that minimized (1), minimized (2), maximized (3) and minimized (4).

As we mentioned earlier, with respect to a given system, the state route map in FIG. 8(A) consists of state zones, center zones and arcs. The optimal route is extracted based on the attributes of each arc by a search algorithm which uses an evaluation function to calculate the values to be used. The algorithm used to find the optimal route may be an available technique such as Dijkstra's rule in graph theory.

We shall next discuss the relationship between the state spaces in a given type of system and the state in an individual system. The state space 210 which is shown in FIG. 2 illustrates the knowledge in the state space of a given type of system. It is not intended to represent state spaces in an individual system. In reality, a state point moves within a state space in each type of system. To keep the discussion simple, up to this point we have not made a distinction between state spaces in a given type of system and state spaces in an individual system. State spaces in individual systems have their own knowledge application devices which can serve as state route maps. When the user inputs the IP address of an individual system, the ID of the state route map which must be copied and used is read out as the route map for that system and set up in the state space buffer. For a state point to actually move in the state space of an individual system with the help of a state space navigator, individual sensors and actuators must be accessed. We will begin by explaining this process. The sequence IP_of_System_M is the IP address of the system.

| IP Address of System | Type of System | ID of File for State Route Map |
|---|---|---|
| IP_of_System_1 | Toyota Calora | Toyota_calora |
| IP_of_System_M | Komatsu Bull 2 | Komatsu Bull |

Figure 8B:
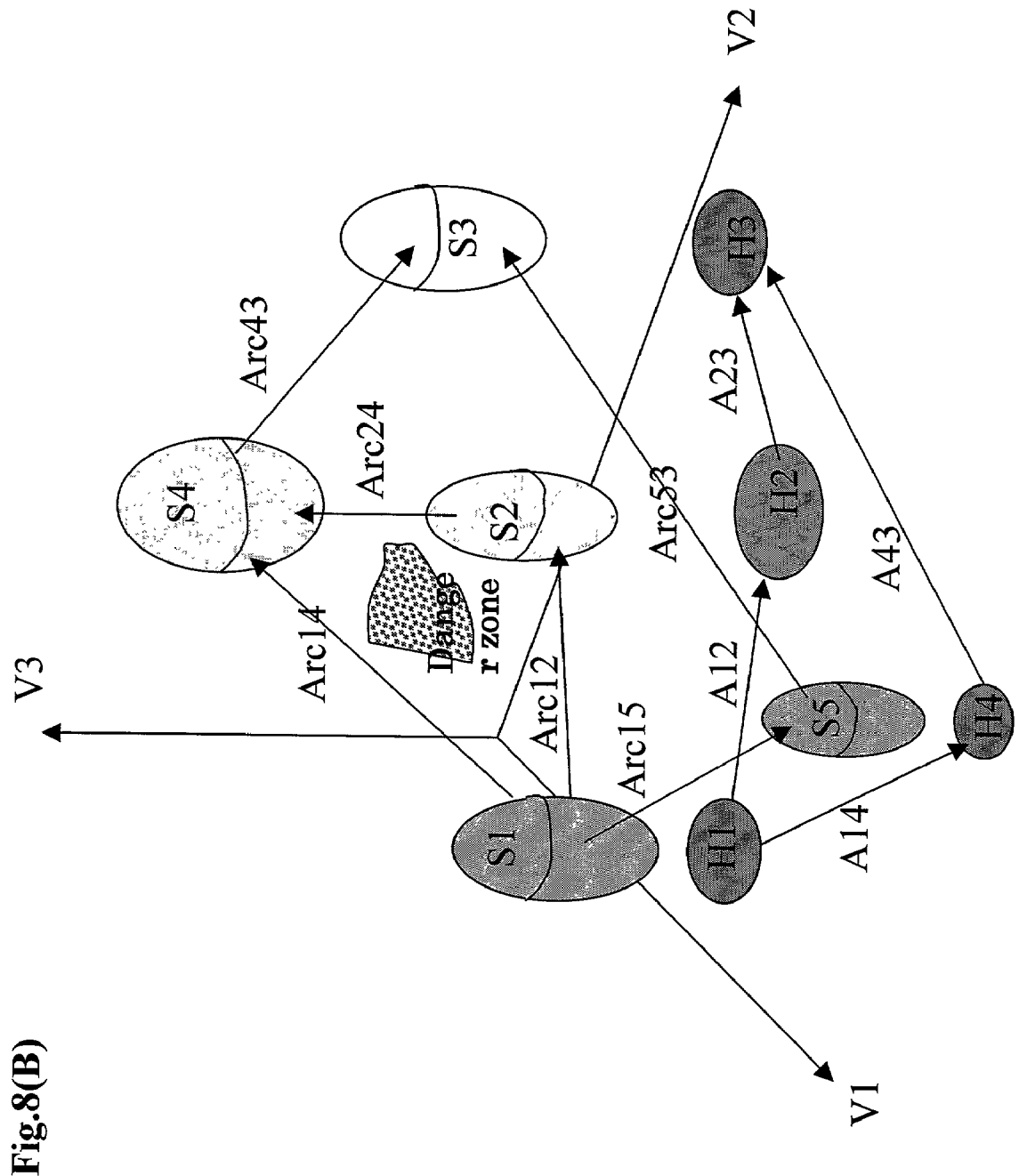
FIG. 8(B) illustrates the concept of a state space when the number of variables is reduced.

Let us assume that the state route map for the aforesaid Komatsu Bull has been obtained from the knowledge data base of the knowledge application device. This state route map, let us say, has been constructed on the premise that the actor is traversing the three-dimensional state space with state variables V1 through V3 that is shown in FIG. 8(B). The empirical data which are set up tell us that the destination, state zone S3, can be reached by way of state zones S1, S2, S4 and S5. In contrast, the user's individual system does not always move in the state space having the dimensions V1 through V3 as expressed in the data base. For example, if the user's system is premised on only two dimensions, V1 and V2, as shown in the drawing, then zones S1 through S5 will have to be expressed in two dimensions as zones H1 through H4. This may be done if the user needs to minimize the time spent searching for the optimal route or reduce the number of sensors accessed. In this case, zones S4 and S2 are combined into H2, and arcs 14, 12 and 24 are combined into arc A12. This truncated scheme has the demerit that when the actor is executing arc A12 from H1 to H2 it may have to go through a danger zone. The newly created state zone H2 may comprehend not only state zones S2 and S4, but a portion of the danger zone as well. Also, although arc A12 is a combination of arcs 14, 12 and 24, it does not reference state variable V3. Arc A12, too, then, might pass through the danger zone. This being the case, we would exclude state zone H2 and arc A12 before trying to navigate. If we eliminate H2, arc A23, which terminates in H2, will automatically be eliminated. In this way a state route map can be altered to conform to the conditions of a given system so that it can be used by the state space navigator. This is why the state route map is set up in state space buffer 1150, as shown in FIG. 9, which will be discussed shortly.

2. The System to Make Use of Knowledge

FIG. 9 shows how the knowledge system of this invention is configured. The system consists of many user systems 1000 and a single knowledge application device 100. User systems 1000 are connected to knowledge system 100 on line through the Internet etc. They are controlled and monitored by the knowledge application device.

2.1. The Overall Flow of Operations in the Knowledge Application Device

In the user system 1000 shown in FIG. 9, sensor 1030 detects object A1010. This fact is converted into a signal representing object A, which is transmitted by terminal control device 1060 over the Internet etc. to knowledge application device 100 (L1). This signal is affected by the configuration of sensor 1030, the way it is mounted, and its amplification etc. The configuration and mounting of the sensor which was used may not be identical to those used when the knowledge data stored in device 100 were accumulated. The signal from sensor 1030 is therefore converted, using the sensing model 1300 shown in FIG. 13, to state variable 1310, which is represented by the letter X. This variable is in a generalized data format. We shall discuss this sensing model in detail in a later section with reference to FIG. 13.

Figure 12:
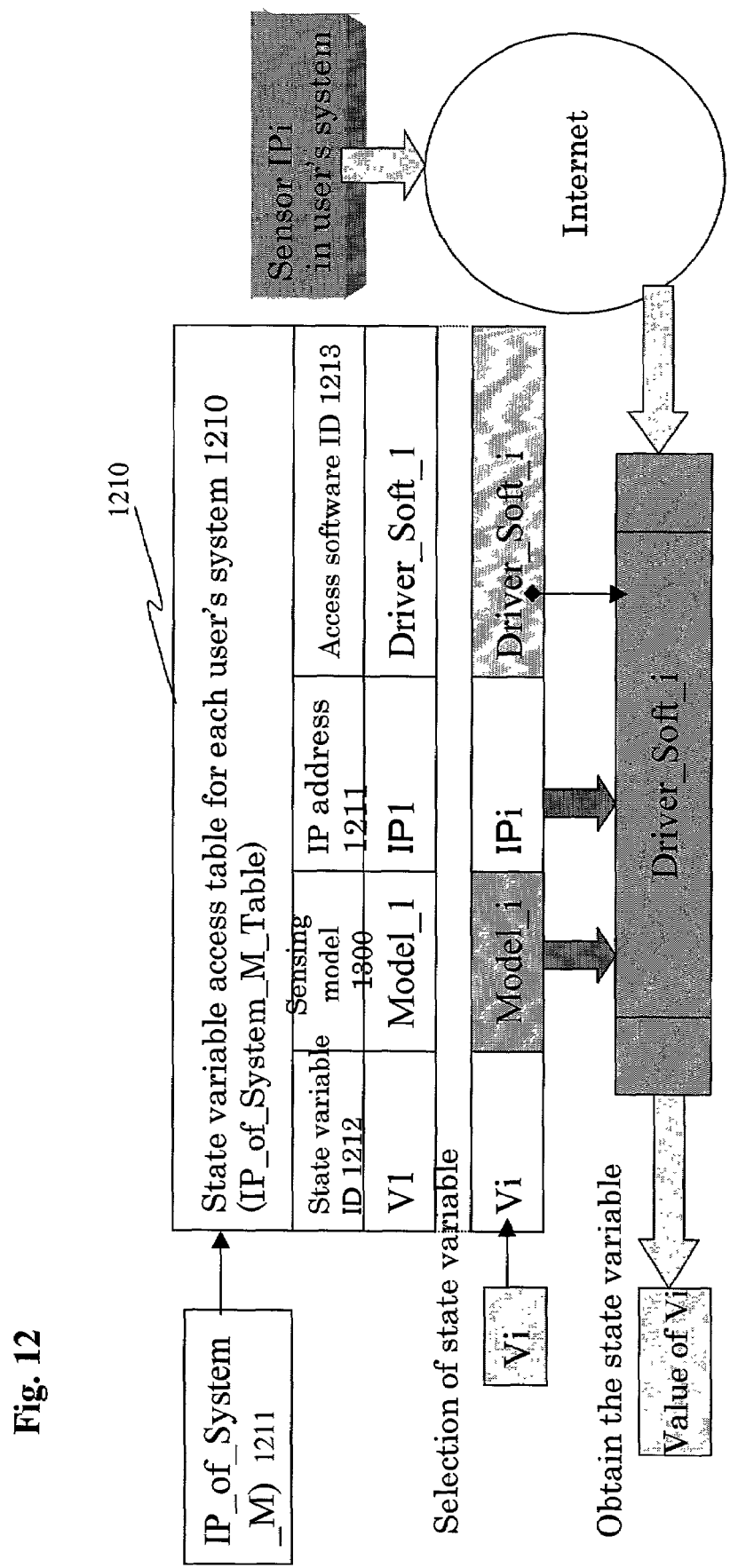
FIG. 12 illustrates the concept of the access table for state variables.

Once the signal has been converted to state variable 1310, it is a standardized input signal which can be compared with knowledge in device 100 or used to create new knowledge. Sensing model 1300, which is used to convert the output signal of a particular sensor to generalized state variable 1310 so that it can be used by knowledge application device 100, is obtained from state variable access table 1210 which uses the IP address and variable ID of the user system as shown in FIG. 12. Sensing models for the sensors used in the various user systems 1000 shown in FIG. 9 are supplied to a driver which accesses the systems through the Internet. The driver uses these models to generate variables.

User system 1000 sends request 1064, which the user has input into terminal control device 1060, to knowledge application device 100 along with the user system's IP address (L2). This request defines the actual processing which the user would like knowledge application device 100 to execute. When it receives the request, state space navigator 1100 in the knowledge application device reads out from knowledge base 1600 the state route maps stored for each type of user system 1000 and sets them in the state space buffer (L3). The navigator determines what type of system the user has by accessing the table of types of systems using the IP address of the user system as the key.

The state route maps read out for all the user systems are converted into a form this system can use and set up in state space buffer 1150. Using the state route map stored in the buffer, state space navigator 1100 in the knowledge application device moves the position which is the current state of the user system (L4). On the basis of the request 1064 (i.e., the destination state) input by the user system via L2 and the current state generated from the sensor signal (L5), state space navigator 1100 calculates the optimal route within the state space. This optimal route is a series of actions to go from the current state to the target state. Each of the actions contains stored knowledge data. These actions may represent a movement from state zone to state zone in a given state space or a movement via feedback control to the position of the target state in a given state zone. Typically, an action will be executed by a program read out of the knowledge base (1600) in which a large set of action software data are stored.

Actor 1400 executes the series of actions specified by the optimal route calculated by state space navigator 1100. The result of execution is sent as a response to the user system through the output control unit (i.e., the output controller) (L6 and L7). In the user system, terminal control device 1060 receives the response. Terminal control device 1060 may display the response, drive an actuator, or exert some effect on object B (L8).

There are three types of responses. The first is the message displayed on screen 1061 of the terminal control device 1060 shown in FIG. 10 or the audio message output by speaker 1065. This display or audio message is for the person operating the target device. The display or audio message indicates what the operator is supposed to do with respect to the target device. When the operator does to that device whatever the message tells him to, the device will assume the appropriate state. The second type of response indicates the manipulated value for the given actuator, which terminal control device 1060 should output. Terminal control device 1060 outputs the manipulated value to the respected actuator. The third type of response is a request to terminal control device 1060 to control the target device using local feedback to bring about the target state transmitted from the knowledge application device. In this case knowledge application device 100 sends data indicating the target state; these data come in two forms. Terminal control device 1060 can receive the target state as a point in the aforesaid state space, or it can receive it as a target value which the signal from sensor 1030 must have. If knowledge application device 100 transmits the target state as a point in the state space, terminal control device 1060, which stores the sensing model that knowledge application device 100 uses, uses this model to convert the value from sensor 1030 to a state variable. The value of this state variable is used to inform the actuator of the manipulated variable in order to execute the feedback control to make the current value match the point in the state space targeted by the knowledge application device. The sensing model is initially set up in terminal control device 1060 through, for example, input unit 1063. This model in control device 1060 is transmitted to knowledge application device 100 via a communication circuit. It is stored there and used to convert the output signals from given sensors into state variables.

2.2. The Configuration of the User's System

Figure 10:
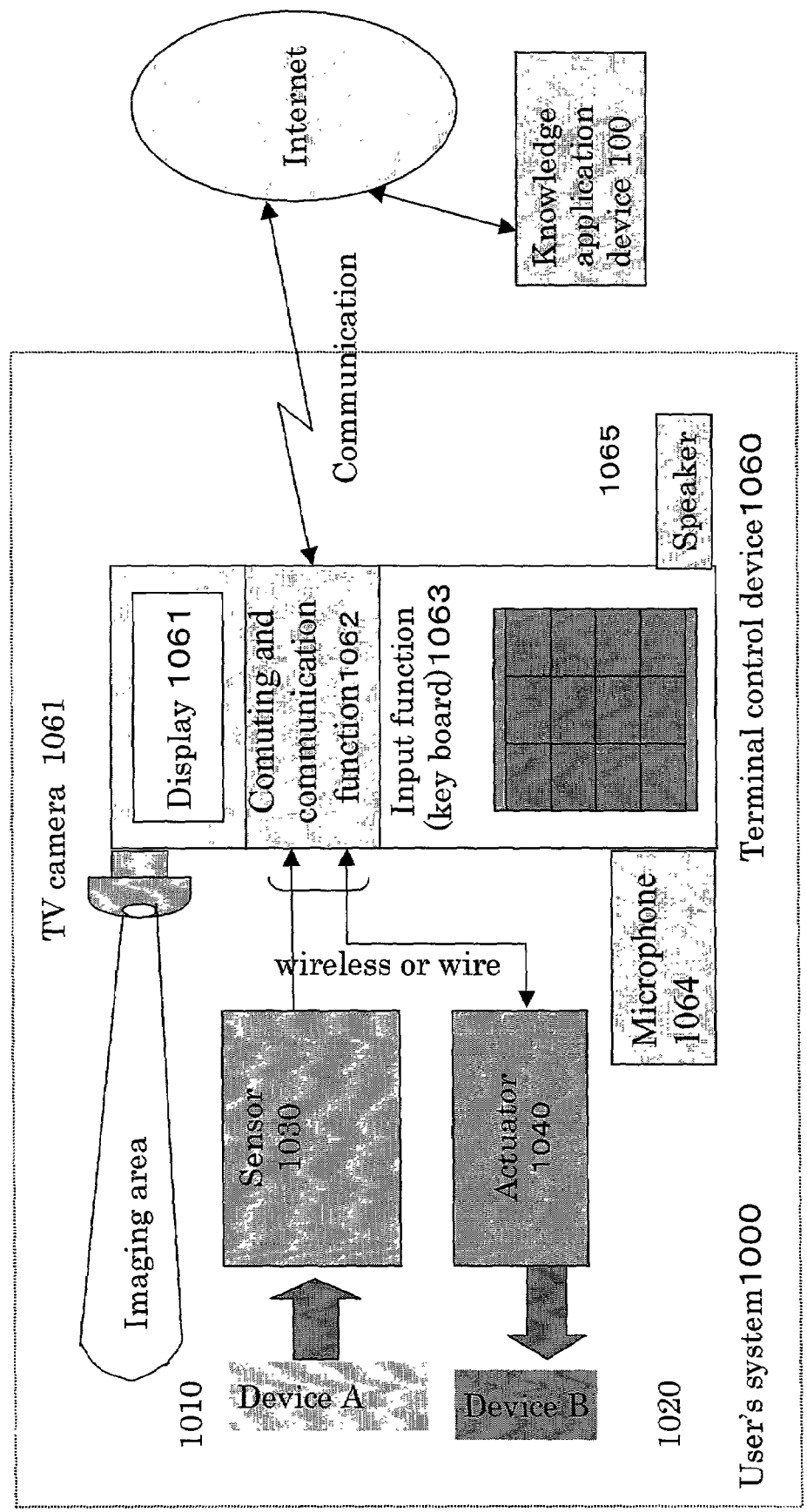
FIG. 10 illustrates the internal configuration of terminal control device generally used.

FIG. 10 is a schematic drawing of a generalized configuration for user system 1000. The output means 1040 and input means 1061 pictured in FIG. 9 can assume any of a variety of forms. The user systems which are a part of knowledge system 1 most commonly consist of a computer and cell phone. These components serve as terminal control device 1060, fulfilling both display function 1061 and input function 1063; and they can access (function 1062) sensor 1030 and actuator 1040. In the user system, a TV camera (1050) can also be set up to capture images to be sent to knowledge application device 100. This allows sensors and actuators to be installed or adjusted under the continuous tutelage of the knowledge application device.

2.3. Initializing Communication between the User's System and the Knowledge Application Device We shall now discuss, with reference to FIG. 10, the initialization procedure which must be followed when user system 1000 is going to avail itself of knowledge system 100. We will assume that the user's terminal control device 1060 is already connected to knowledge application device 100 via the Internet.

Step 1: Recording the Devices to be Controlled

The user manually inputs, via keyboard 1063 of terminal control device 1060, the manufacturer and model number of device A (1010) and device B (1020) and transmits this information to knowledge application device 100. When it receives these data, the knowledge application device conducts a search to determine whether there are state route maps for devices A and/or B in the knowledge base. If there are, it transmits back to the user the data for sensor 1030 and actuator 1040 (name of manufacturer, model number, specifications, etc.) which are premised on these state route maps. If the knowledge application device has no state route map for device B, it sends terminal control device 1060 a menu allowing the user to select whether he wishes the knowledge application device to record the data or whether he wishes to record it himself. If state route maps are stored for both devices, or if the user wants the knowledge application device to create state route maps, the knowledge application device will communicate the information that a payment is required to terminal control device 1060, and this information will be displayed on screen 1061. If the user creates a state route map for his device and stores it in the knowledge application device, and it passes a given test, he will be told that he will receive payment, and that if his route map is used in the future, he will be compensated according to how much it is used. These payments serve as an incentive to encourage many users to create and store state route maps.

Step 2: Selecting Sensors and Actuators

We need to select a sensor 1030 to detect the state of the device and an actuator 1040 to alter that state. The user can make this selection through the knowledge application device by using his web browser software. He can even select and order the sensor and actuator recommended by the knowledge application device off the device's website. When he inputs the specifications of the sensor and actuator that he needs into a site like the one given below, he will be provided with product data concerning sensors and actuators etc. that meet those specifications.

http://www.globalspec.com

Step 3: Installing and Adjusting the Sensor and Actuator

The sensor and actuator acquired by being ordered and purchased in Step 2 must be connected to the device and terminal. They must be installed in the appropriate places, and their various parameters must be adjusted. The user will do the installation himself under the guidance of knowledge application device 100, transmitted through terminal device 1060. The most simple kind of guidance consists of the user downloading from the knowledge application device the manual that explains how to install and adjust the equipment. The manual is displayed on the user's screen so that he can read the instructions as he does the installation. For a higher level of guidance, the knowledge application device provides answers to questions the user inputs into his terminal during installation. Through a web page, the knowledge application device can provide instantaneous answers to the user's questions about the device to be monitored, the sensor, the actuator, the control terminal, or itself etc., thereby guiding the user as he installs and adjusts the sensor and actuator. The knowledge application device has the following web pages to provide answers to questions about products.

http://www.okweb.gr.jp/show-hin/
http://www.okweb.gr.jp/
http://www.spcourt.com/sp/

If this automatic guidance proves insufficient, the user can transmit an image to the knowledge application device (for example, an image of the sensor and the location where he wants to install it) via the terminal device's TV camera 1050. The serviceman at the knowledge application device can view the image, hear any sounds emitted by the device to be monitored as well as the user's voice, and talk to the user as he instructs him in how to install and adjust the sensor and actuator. For this purpose, any diagrams the user needs can be displayed on the screen of the terminal; and the serviceman for the knowledge application device can instruct the user or ask him questions by voice.

Step 4: The Initial Test of a State Route Map

By Step 3, the sensor and actuator have been installed and adjusted; they have been properly connected to the device to be monitored; and the sensing model for the sensor, the access table for state variables, the driver software, the IP address table for external systems, the table of commands for internal actuators, the file of state route maps, and the model that generalizes all of these for the user's system have all been set up. The user's system model is read out when the IP address of his system is sent by his terminal to the knowledge application device. State route maps are read out using file names stored in the user's system model. Next, the access table for state variables, the IP address table for external systems and the table of commands for internal actuators which are stored in the user's system model are read out. To read the position of the system in the state space, the sensors which correspond to the state variables are accessed using the access table for state variables. The sensor output is converted to state variables using the sensing model. When all the state variables are assembled, the state position of the object in the state space becomes clear. Taking this state position as the starting point, the state route maps are searched for a route through each state zone. The algorithm used to solve this "travelling salesman" problem is one which is commonly employed in the field of graph theory. It is stored as a file at the following site.
http://www.softlab.is.tsukuba.ac.jp/~george/thesis/program-Contest.PDF The arcs constituting the route extracted in this way are executed. If the object is able to navigate the state space according to the instructions given in the route, a judgment is rendered that the state route map can, without reservation, be used in the user's system. If the navigation fails, an error message is displayed on the screen of the terminal.

Step 5: Initiating Operation with the State Route Map

By Step 4, it has been determined that the user's system is set to go using the state route map. That being the case, when the user inputs a request to the knowledge application device via his terminal, his system's IP address is transmitted (1064). As has been discussed, there are seven types of requests.

1) Set a target state.
2) Select a standard by which to evaluate routes to the target state (Select an evaluation function).
3) Designate a program to be executed.
4) Obtain the output representing the result when the current position is detected (Request monitoring).
5) Obtain the output representing the result when the current state has been diagnosed using a given method (Request diagnosis).
6) Obtain a second search for the optimal route to a target state (Request second search).
7) Control the terminal or knowledge application device.

Request 1) above specifies the name of the state zone that is the destination. Request 2) above may specify either the name of the evaluation function or the coefficient, $K_1$, $K_2$, . . . , $K_5$, etc. of the synthetic evaluation function explained in Section 2.4.5. Request 3) above selects a program to execute from the set of programs that may be executed in the state zone that the current state is in (for example, application software that is stored in the state zone as a nearby function). With request 4), the user may ask to see the numerical values of all the state variables which comprise the current state, or he may request the knowledge application device to automatically generate, using the values of the state variables, the image of a face with the size of the eyes and the angle of the eyebrows etc. controlled to simulate different expressions. As a third alternative, the values may be displayed in the form of a graph. Request 5) above asks to see the result when the values of the state variables constituting the current state are compared with reference values or values defining a permitted range, or it asks to be told, when this result is processed, whether the current state is abnormal or normal. Alternatively, the terminal device could store the reference values or the permissible range, and the knowledge application device could transmit only the current state. The user's system could then compare the values and display the result on the terminal screen. Request 6) above asks the knowledge application device to repeat the search for the optimal route using the evaluation function previously specified. The state of the device being monitored changes moment by moment. The changes it undergoes may make the optimal route designated in the state space no longer appropriate. When this happens, a request to redo the search can be crucial. When the user requests that the search be redone, an actor whose current position has strayed from the optimal route can be put back on course. This request, then, is necessary to keep the system stable and functional. The user's terminal may automatically and at regular intervals request that the knowledge application device do a second search, or the user may manually input the request from his terminal. Alternatively, the knowledge application device may automatically redo the search at regular intervals, or when the current state position has strayed a given distance off the optimal route. Request 7) above is used to execute maintenance procedures such as recording or erasing knowledge in the knowledge application device, changing the communication software, or diagnosing the knowledge application device when it malfunctions. It is also used when the terminal device needs a maintenance procedure, or to record or erase data or change the communication software or the man-machine interface software in the terminal etc. When the requested processing is completed, the terminal control device goes into "stand by for request" state.

2.4. Knowledge Application Device 100

In this section we shall give a detailed explanation of the knowledge application device 100 shown in FIG. 9.

2.4.1. State Space Navigator 1100

Figure 11:
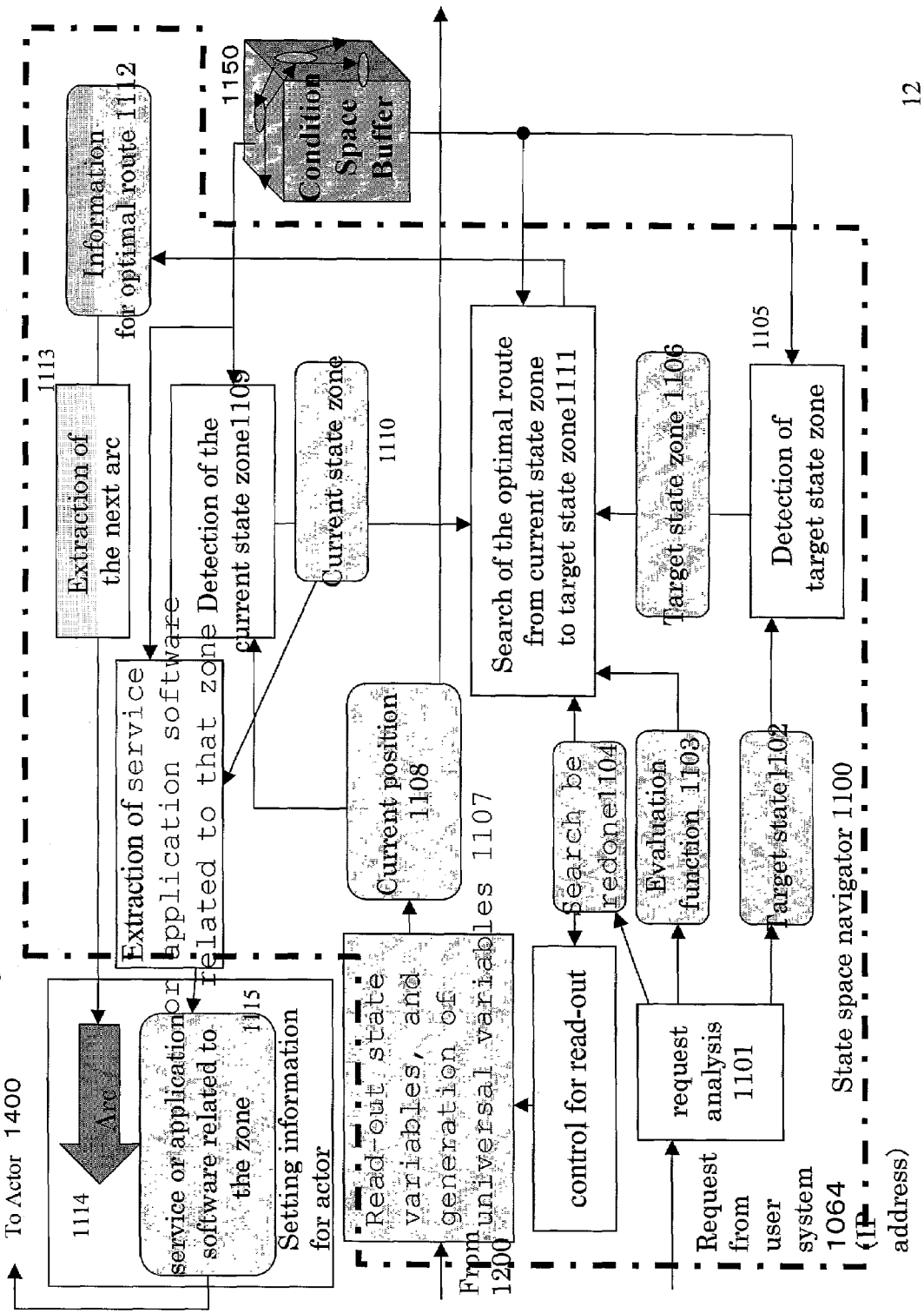
FIG. 11 illustrates a diagram of the internal configuration of the state space navigator in the knowledge application device shown in FIG. 9.

FIG. 11 is a diagram of the internal configuration of the state space navigator 1100 in the knowledge application device 100 shown in FIG. 9.

The request 1064 which was input into state space navigator 1100 is analyzed by the request analysis function (1101). As was stated above, there are seven types of requests. However, in the block diagram in FIG. 11, the request from user system 1000 is analyzed as one of three types: (1) setting a target state (1102; (2) selecting an evaluation function to be used in the search for the optimal route to the indicated target state (1103); or (3) requesting that the search be redone (1104). Out of the seven requests, we can assume that the current state will ordinarily be detected and output (request for monitoring) and the result of comparing the current state with a given reference (request for diagnosis) will ordinarily be output even without a request from the user. When the target state is set, it will be compared with each state zone on the state route map for the system which is stored in the state space buffer to detect which zone it is in (1105). If the target state is inside the boundaries of a state zone, that state zone is extracted as the target state zone (1106). When the user requests "Set evaluation function" (Request (2) above), he can cause the search for the optimal route to be performed using an evaluation function other than the default function. In this case the default evaluation function used in the optimal route search is replaced by the function selected by the user before the search is executed (1103). The state space navigator may receive as input a request to redo the search for the optimal route (1104). When this occurs, the navigator will update the current state based on sensor data and obtain the optimal route without changing the evaluation function.

The read-out function by which state variables are read out via L5 in FIG. 9 (1107 in FIG. 11) accurately ascertains the current state at regular intervals. The state variable read-out function obtains the values of the state variables from the recognition function (1107). This set of values for state variables indicates the current position of the system in the state space (1108). To find the current position in the state space, the position is compared with every state zone on the state route map for the system which is stored in the state space buffer to detect which state zone it is in (1109). When both the state zone in which the target state can be found (1106) and the state zone where the current position lies (1110) have been determined, a search is performed for the optimal route between them using the state route map (1111). As was mentioned earlier, Dijkstra's algorithm is used to execute the search.

When the optimal route has been found, the relevant data are stored in the buffer. The optimal route data (1112) can be expressed as repeated series of state zone→arcs, as is shown in FIG. 8(A) (1113 and 1114). An arc has the configuration shown in FIG. 7. In any state zone, there may be service or application software related to that zone stored there (1115). If software is stored there, it may be configured such that it is automatically initiated when the actor enters the state zone, when he is in the zone, or when he leaves the zone. Alternatively, the user may select the service or application etc. The arc not only executes a state change; it also executes the service incidental to that state zone.

When the state space navigator detects which state zone the current position is in, it compares the center position of that zone with the current position. It obtains the difference between the two positions and evaluates this difference. It may do this by assuming that since the center position of the state zone is the most desirable position in that zone, the smaller the difference, the better. The navigator transmits the result of the evaluation to the user's system via a communication channel such as the Internet etc. If the user has a system like that shown in FIG. 10, the result can be displayed as a face on the screen or as a radar chart. Because people find it relatively easy to evaluate state variable values if they are somehow put together, it can be effective to display the result as some kind of diagram.

There is service or application software stored in every state zone. When the actor's position enters a given state zone or is near a given state zone, the "nearby" function will cause the service or application programs stored within a given distance (chosen by the user) of the current position to be listed up. (The distance can be considered to be the number of arcs needed to reach the destination by the shortest route.) The Nearby function would start an application when, for example, a car, based on data from various sensors installed in it, enters the state zone indicating that there is a danger of theft (as when intense vibration is detected by the vibration sensor). The application might be automatically reporting an attempted theft. The services or applications which are listed up have the following attributes.

(1) A flag to indicate whether they are automatically started or manually started.

(2) The priority ranking by which they should be started up.

(3) A flag which is tripped when the state zone enters the Nearby range (the "hello" function).

(4) A flag which is tripped when the state zone leaves the Nearby range (the "goodbye" function).

(5) A flag which remains set as long as the state zone is in the Nearby range (the "staying" function).

The data representing the current state zone and position are ordinarily sent to the user's system, which can then display them. The evaluation data for the current position may also be sent to the user's system and displayed.

2.4.2. Recognition Unit 1200

In this section, we shall explain the workings of recognition unit 1200 during the process in which sensor variables etc. are input.

The recognition unit 1200 pictured in FIG. 9 receives from the read-out function (not pictured) in the state space navigator in FIG. 11 a request which designates state variable IDs 1212 and IP addresses 1211 and asks that the state variables be read out. When it receives such a request, the access table for state variables shown in FIG. 12 is read out. The state variables might, for example, be the ID numbers that specify given sensors. Sensing model 1300 and software access ID 1213 (the data which designate a driver) are read out, and the driver 1214 stored in the action software DB is started up. The sensing model and the IP address of the relevant sensor are input into the driver. Based on the IP address of the sensor, the knowledge application device obtains the output signal of the sensor by way of the Internet in the form of digital data. It uses a sensing model to process this signal into a generalized state variable which is not dependent on what type of sensor etc. was used and then outputs the state variable.

2.4.3. Sensing Model 1300

Figure 13:
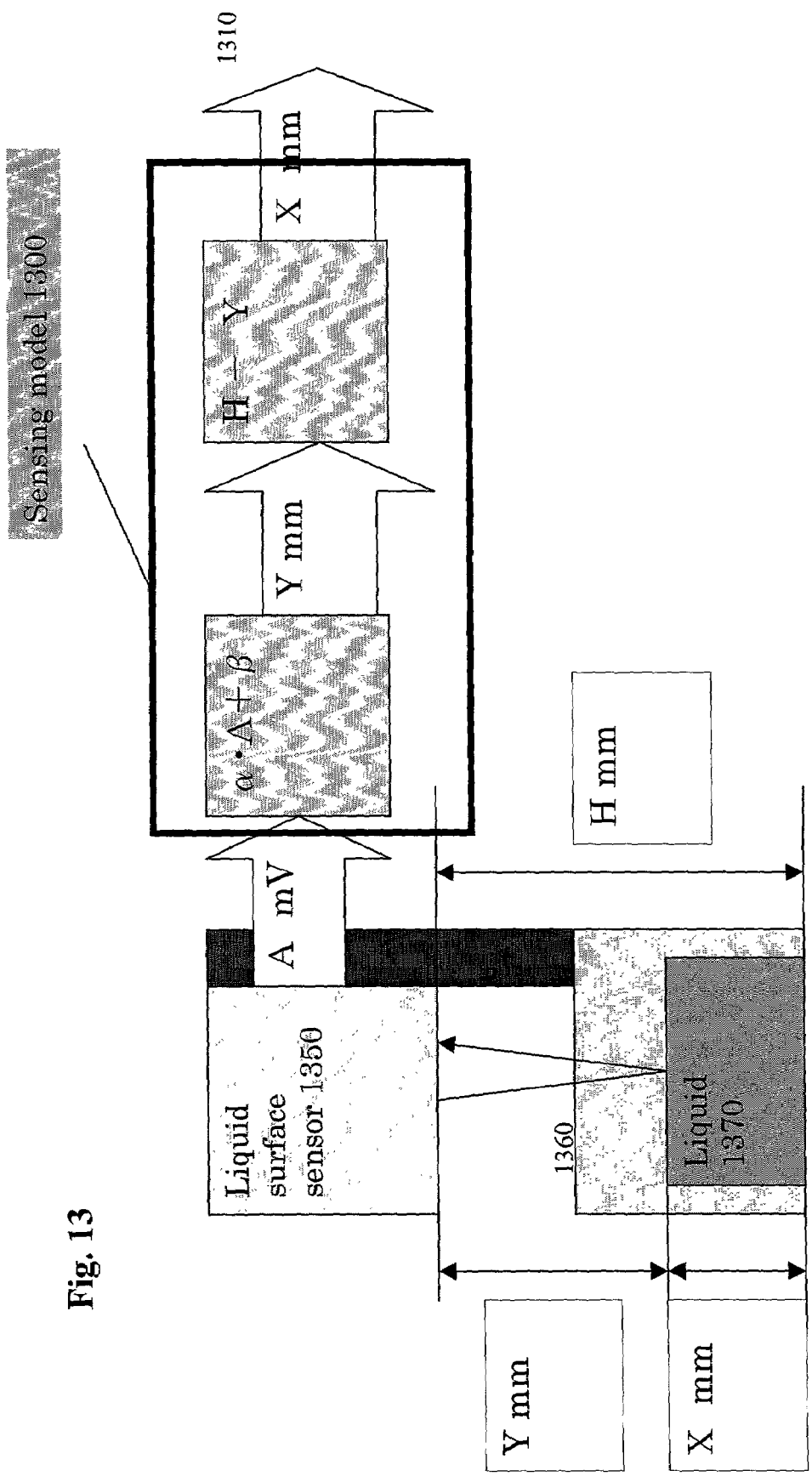
FIG. 13 illustrates a schematic drawing which illustrates the concept of how the output signal from the sensor is converted using sensing model.

FIG. 13 is a schematic drawing which illustrates the concept of how the output signal from the sensor is converted using sensing model 1300. The sensing model converts the output data from individual sensors etc. into state variables, which are generalized output data with no effect from the characteristics or installation of the sensors. Processing the output into this sort of universal data provides us a way to make use of previous knowledge data stored in the knowledge application device. Liquid surface sensor 1350 detects the quantity of liquid 1370 which is left in tank 1360 (by detecting the height X in mm from the bottom of the tank). X is information which represents the state of the thing being detected. It is independent of the type of sensor and its installation. The signal AmV, which is the output of liquid surface sensor 1350, is converted into the universal state variable X mm by sensing model 1300. Here the detected voltage AmV is converted into the distance Y mm from the position of the sensor to the surface of the liquid by the formula $Y=\alpha \cdot A + \beta$. The state variable X mm, which is independent of the height H at which the sensor is mounted, is obtained by the formula $X=H-Y$. These state variables represent the state of the object.

2.4.4. Actor 1400

Figure 14:
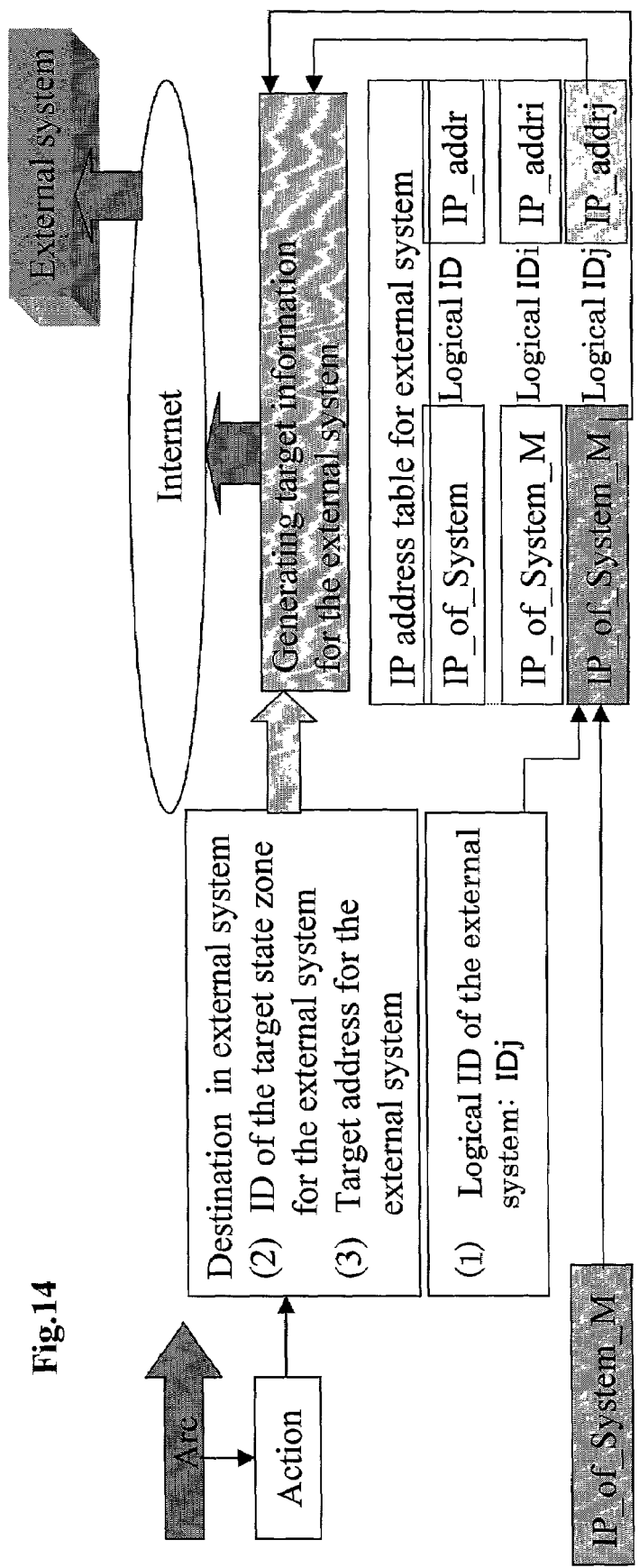
FIG. 14 illustrates a schematic diagram of the process by which an arc is executed to the exterior system.

FIG. 14 is a schematic diagram of the process by which an arc is executed to the exterior. The arc is executed by two separate means. The first entails specifying a destination outside the system, and the second entails driving an internal actuator.

When the destination is an external system, all the current system does is specify that destination. The system which receives the designation (if it is controlled by a state space navigator which uses a state route map of that system) activates the functions of that system. If the destination is an external system, three conditions must be fulfilled.

(1) The destination is specified by the IP address of the external system.

(2) The IP address of the system which is the designated destination must be transmitted to the external system.

(3) The destination specified indicates the state position and zone in the external system which is the destination. The external system which receives the designation itself determines the optimal means to arrive at the destination. Each external system will have its own state space navigator make this determination.

Figure 15:
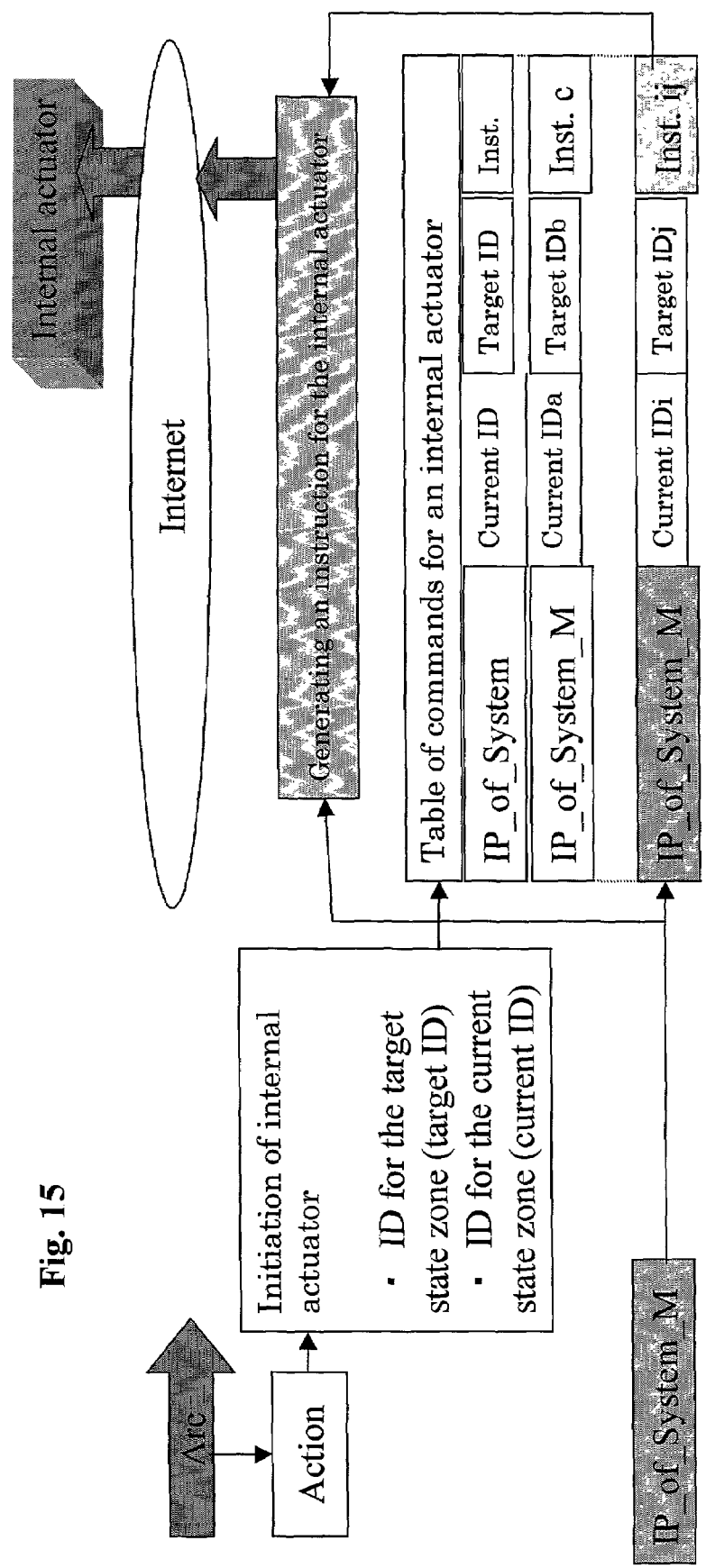
FIG. 15 illustrates a diagram of the process by which an internal actuator is activated.

FIG. 15 is a diagram of the process by which an internal actuator is activated. The activation process goes as follows. If an action which is part of an arc activates an internal actuator in the system, and causes a state zone in that system to move to a targeted state zone, the table of commands for an internal actuator is accessed and a command is extracted. The extracted command generates an actual command as well as the IP address of the system, IP_of_System_M, and transmits these data to the internal actuator via the Internet.

2.4.5. Search 1111 for the Optimal Route

In search 1111 for the optimal route, which is conducted in the state space navigator 1100 shown in FIG. 11, a route evaluation function is used to extract the optimal route from a state route map. A route is a series of arcs and state zones. The evaluation function is used to calculate the value of each route based on the attributes of the arcs and state zones.

1. The Attributes of an Arc (A1) The time required to traverse the arc.

(A2) The probability of traversing this arc and reaching the state zone which is the destination of the arc.

(A3) The cost (in money, energy, etc.) of traversing this arc.

(A4) The number of state variables which must be changed to traverse this arc.

(A5) The rate of displacement needed in the state space to traverse this arc.

2. The Attributes of a State Zone (B1) The volume of that state zone.

(B2) The volume of the center zone of that state zone.

(B3) The number of arcs which lead out of that state zone.

(B4) The number of service and application software programs stored in that state zone.

The following evaluation functions might be executed using the aforesaid attributes. Functions consisting of combinations of these are also possible.

F1 (A1): The smaller A1 is, the greater the value of the arc.

F2 (A2): The greater A2 is, the greater the value of the arc.

F3 (A3): The smaller A3 is, the greater the value of the arc.

F4 (A4): The smaller A4 is, the greater the value of the arc.

F5 (A5): The smaller A5 is, the greater the value of the arc.

We shall next discuss the rate of displacement in the state space. Let us call the state variable Vi. Min_i is the minimum value of Vi and Max_i is its maximum value. We can then indicate the width $\Delta i$ of the zone of each state variable by the following formula.

$$\Delta i = \text{Max}\_i - \text{Min}\_i$$

Let us call two arbitrary points in the state space P and Q.

The coordinates of point P in the state space are (P1, P2, ---, Pi, ---, PN).

The coordinates of point Q in the state space are (Q1, Q2, ---, Qi, ---, QN).

The rate of displacement R between points P and Q is obtained by the following formula.

$$R = SQRT(\Sigma(Pi-Qi/\Delta i)^2) \; i=1$$

The overall evaluation function based on the attributes of the arcs we shall call F (A1, A2, A3, A4, A5).

$$F = K1*F1(A1) + K2*F2(A2) + K3*F3(A3) + K4*F4(A4) + K5*F5(A5)$$

If we consider overall evaluation function F to represent the length of the arcs in question, then we can obtain the shortest route by using the search algorithm.

There are four types of evaluation functions based on the attributes of the state zone.

G1 (B1): The greater B1 is, the greater the value of the zone.
G2 (B2): The greater B2 is, the greater the value of the zone.
G3 (B3): The greater B3 is, the greater the value of the zone.
G4 (B4): The greater B4 is, the greater the value of the zone.

The overall evaluation function we shall call G(B1, B2, B3, B4).

$$G(B1, B2, B3, B4) = h1*G1(B1) + h2*G2(B2) + h3*G3(B3) + h4*G4(B4)$$

To use the evaluation function based on the attributes of the state zones to find the optimal route, we must first add the value of the zone which is the base node of the arc to the value of the arc. We can then use an ordinary algorithm for finding the optimal route (e.g., Dijkstra's method).

Possible attributes of state zones include values such as no entry/okay to enter; good/bad; dangerous/safe; name of state; size of state; and time state may continue and others.

2.4.6. Knowledge Base 1600

Figure 16:
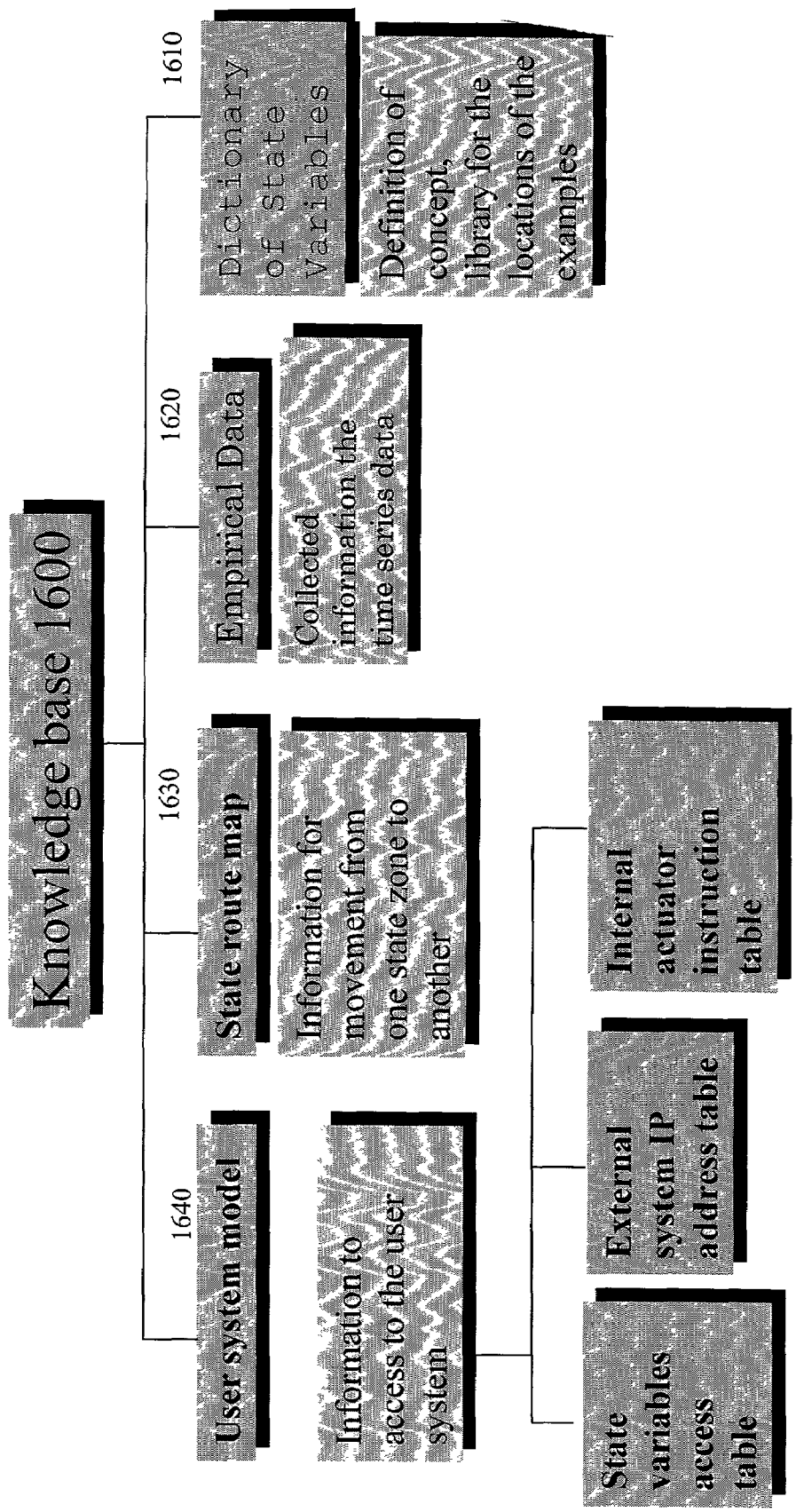
FIG. 16 illustrates the overall configuration of knowledge base in the knowledge application device shown in FIG. 9.

FIG. 16 shows the overall configuration of knowledge base 1600 in the knowledge application device 100 pictured in FIG. 9. It contains the following knowledge data.

Dictionary of state changes: Definitions of concepts and a library of the locations of the actual data related to those concepts.
Empirical data: Accumulated data integrated on a time base.
State route map: Data concerning movements between states in the state space of a system.
Model for user's system: Data used to access the user's system.

The attributes of each of the aforesaid knowledge items are given below.

1) Dictionary 1610 of State Variables

Figure 17:
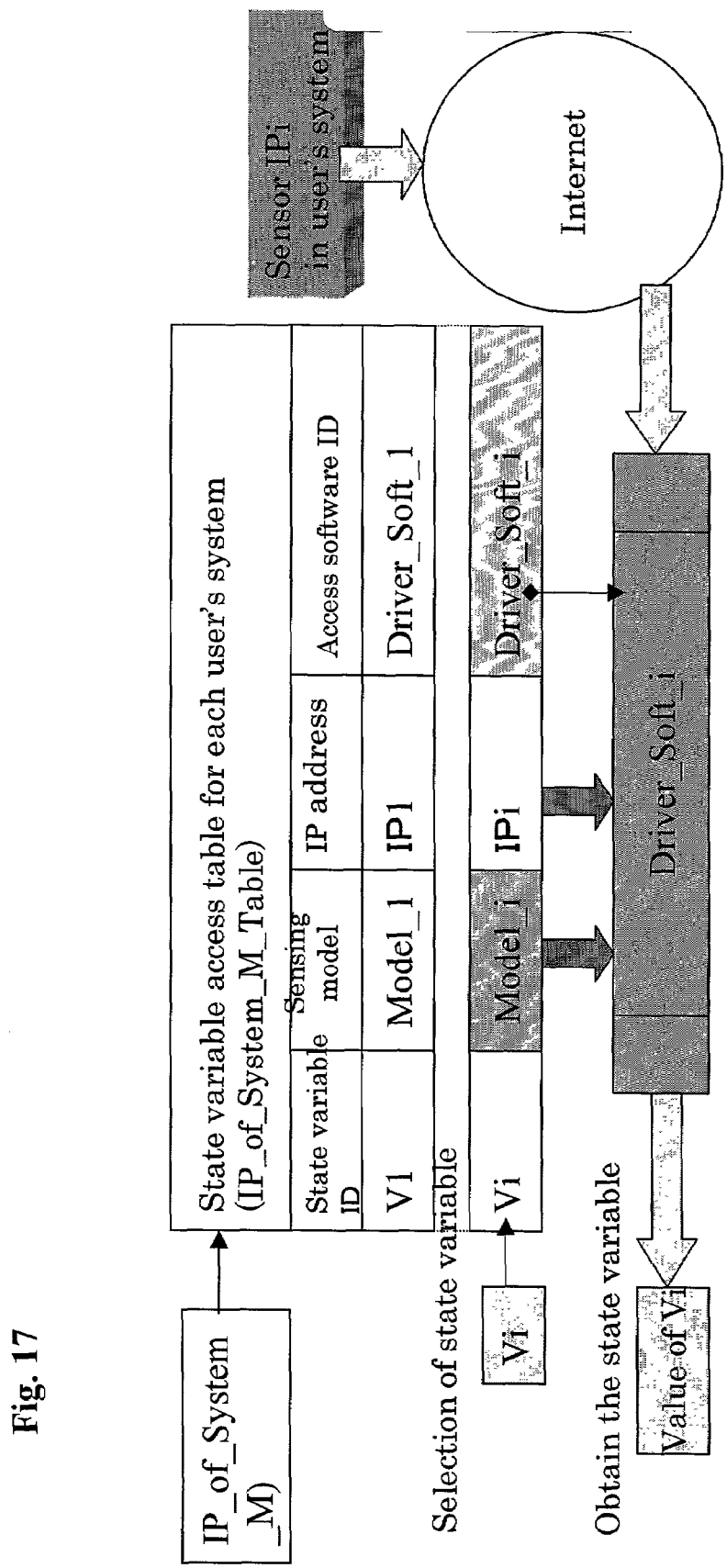
FIG. 17 illustrates the access table for state variables in the dictionary of state variables.

The dictionary of state variables shown in FIG. 17 contains the following items for each state variable.
1. The name of the state variable.
2. A sentence defining the state variable.
3. The variable name corresponding to that state variable (i.e., the state variable ID).
4. The access table needed to obtain the value of that state variable.

2) Empirical Data 1620

With respect to specific variables for a specific type of object being monitored, the value of the variables represents the pattern of change over time as well as any comments or instructions transmitted to the output means at certain points in time. These data may also be accumulated and processed in some way such as by being averaged etc. They consist of the following.
1. The model of the device being monitored, the IP address of the sensor and the names of the state variables to be tracked.
2. The values of the time series data accumulated at each sampling time.
3. The specific points which are sampling times, the sampling interval that shows the pattern that characterizes these points, character strings encoding attached comments, and instructions to the output means.

Examples of Empirical Data Concerning Temperature
1. Type of sensor: thermometer
2. IP address of sensor: 123. 456. 789. 012
3. ID of state variable being tracked: temperature
4. Type of device being monitored: refrigerator PA001
5. Time series data for sampled values at each sampling time:
N, (51, val1) (52, val2) - - - (tN, valN)
6. Sampling times at specific points and character strings encoding appended comments.
M, (51, 51s; msg1) (t2, t2s; msg2) --- (tM, tMs; msgM)
Note: Here the time interval [t1, t1s] is the interval of the time pattern which characterizes the point t1.
7. The sampling times at characteristic points and instructions to the output means.
N, (t1, t1s, cmd1) (t2, t2s, cmd2) --- (tN, tNs, cmdN)

3) State Route Map 1630

This map consists of data provided for every type of device (as distinguished by the route map code). It is accessed using the ID number for the state route map. Data for numerous state variables are integrated on a state space axis. As is shown in FIG. 4, they consist of the following structural elements.
1. State zones
2. Arcs
3. Danger zones
4. A list of the state variables that comprise the state (These include zone data for each state variable, unit data, type of sensor which is recommended, and data specifying installation and adjustment.)
5. Code for state route map, date created, author, list of types of devices to be monitored.

State zones consist of the following structural elements.
1. The name of the state zone
2. A description of the state zone
3. The coordinates of the center point of the state zone
4. The parameters which define the center zone
5. The parameters which define the borders of the state zone
6. A list of service routines attached to the state zone Arcs consist of the following structural elements.

IF Current is inside of AREA [i] & Destin is inside of CONV [j] THEN ACTOR=(Goto CENT [i] from Current, Action [i,j] and Goto Destin from arrival in AREA [j])

Arcs also consist of data specifying danger zones, parameters for their borders and the type of danger.

4) Model 1640 for the User's System

This is a model used to access the user's system. There is one model for each IP address for a user's system. They consist of (1) an access table for state variables; (2) a table of IP addresses for external systems; (3) a table of commands for internal actuators; and (4) file names for state route maps.

(1) The Access Table for State Variables

This table contains data to convert the signal from the sensor monitoring the device to a variable value for the device. The signal output by the sensor is affected by what type of sensor it is, where it is mounted, its sensitivity and other factors. Signals may be in a variety of forms (analog, digital, current wave form, voltage wave form, frequency, etc.). If each signal is subject to these various conditions, it is impossible to compare knowledge using the raw signals, and a given signal cannot be compared or integrated with the signal from another sensor. This is why we convert the signals to state variables. The sensing model needed to convert the signal to a variable consists of the IP address to access the sensor and the ID of the software used to access it.

We shall next describe the attributes of the sensing model. A sensing model is the data needed to convert the signal obtained from a sensor into a state variable. The signal is converted by a program which is specified by parameters that control the conversion. If a single universal program is used to convert the signal, the sensing model will consist only of the parameters which control how the universal program executes the conversion. There are several possible choices for a universal program, including programs to calculate a Taylor series, a Fourier series or a wavelet series etc. If the program is to be universal and a Taylor series is used, the parameter to control the aforesaid conversion will be a Taylor expansion coefficient. If a Fourier series is used, the parameter which controls the aforesaid conversion will be a Fourier expansion coefficient. Similarly, if a wavelet series is used, the parameter will be a wavelet expansion coefficient.

If a number of programs are used to convert the signal, the sensing model will consist of the data specifying the conversion program (e.g., a pointer for the functions and the name of the file where the program is stored) and the parameter which controls the conversion in that program. In this case, the data specifying the conversion program are used to read the program out of the dedicated storage device or another storage device. If the sensor has sufficient function to allow it, the sensor is requested to upload the conversion program and the sensing model which consists of the set of parameters to control the conversion. The sensing model which the sensor outputs in response is then read and stored so it can be used to generate state variables in subsequent processing. In particular, if the sensing model is written in a programming language like Java, which can be run no matter what CPU or operating system is used, the Java program can be uploaded from the sensor or the gateway that generalizes the sensor and used to convert the signal to a state variable.

(2) The Table of IP Addresses for External Systems

This table sends back the IP address of an external system when it receives the logic ID of an external system whose IP address is connected to that system and which can be accessed from the knowledge application device. The table is used to send commands to external systems.

(3) The Table of Commands for Internal Actuators

This table contains commands which are read out from the IP address of the system, the ID of the current state zone and the ID of the state zone which is the destination. These commands are sent to internal actuators in the system being monitored.

(4) File Names for State Route Maps

These names consist of the IP address of the user's system and the ID number for the state route map to be used as a map of the system.

3. Examples of Business Models Employing the Knowledge Application System Related to this Invention As has been discussed above, the knowledge application device and system according to this invention allow customers to input, via the Internet, requests like the following in order to make use of empirical data.

EXAMPLES

Type 1. The customer wishes to find out if the temperature in his refrigerator has gone up, if the rpm of his engine is too low, or if his water has become acidic, etc. In other words, he wants to know the state of something (i.e., state detection service).

Type 2. The customer wants a diagnosis of whether his refrigerator is losing its gas, his belt is getting worn out, or some foreign matter, etc. has gotten into his water tank (i.e., diagnostic service).

Type 3. The customer wants a prediction of how soon the gas must be recharged, whether the engine will break down if the car's spot checks are not done, or when the water tank is nearing the end of its service life, etc. (i.e., prediction service).

When it receives these sorts of requests, the knowledge application device acquires the necessary data and accumulates as many experiences as it can. It can then send the user the optimal information it can construct based on these experiential data and collect a service fee. In response to a Type 1 request described above, the knowledge application device uses the data transmitted by the various sensors on the user's system to detect the state of that system. An example of a Type 2 request is a situation in which the output of the user's sensors tells us that the temperature in the refrigerator is rising but the humidity is remaining the same. The knowledge application device needs empirical data to provide the diagnosis that the compressor is malfunctioning. A Type 3 request takes the service one step further than diagnosis and asks for a prediction. This also requires that the knowledge application device accumulates a large amount of experiential data.

The knowledge application device of this invention is not limited to the three applications discussed, namely detecting the state of a device, diagnosing it and predicting something about it. The data used to detect, diagnose and predict could also be used, for example, to determine which customers would need a given service, such as repairs, maintenance or the purchase of a replacement product etc. Publicity could then be provided for companies that provide these services. The knowledge application device could thus be used to provide highly processed knowledge to customers. Other services might include analyzing the various data which the knowledge application device related to this invention accumulates to determine the pattern of use or breakdowns for each type of device or data on its service life. These data such as service life and others could then be provided, for a fee, to the relevant makers, research companies or consultants etc.

Furthermore, with the knowledge application device related to this invention, a third party could combine the aforesaid diagnosis and prediction data with relevant attribute data (name and address of company, contact person). This would make these data objectively more reliable, and would enable someone to offer a data authentication service. Such a service would be performed by a third party when objective data were required. For example, such a service might verify the state data that indicate objectively how a device, say a car or a piece of office equipment etc., was used in the past. The state data, then, could be viewed as reliable by someone buying used equipment.

In this section we shall discuss three realistic business models as examples of the knowledge application device and system according to this invention. These models are (1) a model used to select customers for rental equipment (for example, to rent a bull-dozer); (2) a model to improve maintenance of leased equipment (for example, a leased bulldozer); (3) a model to verify data concerning how equipment bought used had been treated.

3.1. A Model for Selecting Customers for Rental Equipment

3.1.1. An Outline

The first business model we shall present which employs the knowledge application system according to this invention is a model to select customers for rental equipment. This would apply to a situation in which a company that owns bulldozers rents them for a given period of time to customers such as construction companies etc. From the rental company's point of view, it is naturally desirable to rent only to customers who will use the bulldozer properly. With a bulldozer (but this would apply to many kinds of rental equipment: cars, trucks, construction equipment, generators, computers, communications equipment, etc.), once the equipment is rented, the rental company has no simple way to find out how it is being used. In many cases, the person using the bulldozer is not at all concerned about its proper use. With this business model, (1) a customer who has used the bulldozer properly is given a rental discount; and (2) a customer who has used the bulldozer improperly is given instructions or guidance in its proper use. In this way the rental company can give the customer an incentive to use the bulldozer properly.

According to the business model related to this invention, sensors are installed on various parts of the bulldozer. The data representing what they sense are transmitted at regular intervals to the knowledge application device of this invention either via the Internet or remotely. The sensors installed on various parts of the bulldozer correspond to sensor 1030 in FIG. 10. Their purpose is to allow someone to understand how the bulldozer is being used. They might, for example, include a pressure sensor to detect the pressure of the operating oil in the lift cylinder; an oil sensor to detect how much oil is left in the tank; and an angle detector to sense the angle of the lift arm etc. Since sensors capable of transmitting data via the Internet are already widely known, we shall not describe their configuration here.

When the data detected by the sensors are sent to the knowledge application device, the state space navigator in that device marks, in the state space defined by previous use of bulldozers, the state position that indicates the current state of that particular bulldozer's use. It creates many state zones in that state space to indicate various states having to do with that bulldozer's use. The knowledge data indicate whether the movements from one state zone to another are the proper ones. As the bulldozer changes states, the proper movements are those connected by arcs to the destination, the position representing the proper state of use. In other words, a state route map is created which can be used to remotely monitor the state of the bulldozer's use. The state route map is drawn by the person running the system which employs the knowledge application device or by someone at the bulldozer rental company.

With the state route map, the current state detected by each sensor is obtained, and, as mentioned previously, customers who use the bulldozer properly are given a discount on their rental fee. Customers who use the bulldozer improperly are given instructions or guidance for proper use. We shall shortly provide a detailed explanation of a typical state zone and state space navigation used for this purpose.

3.1.2. State Zones for Driving a Bulldozer

Figure 18:
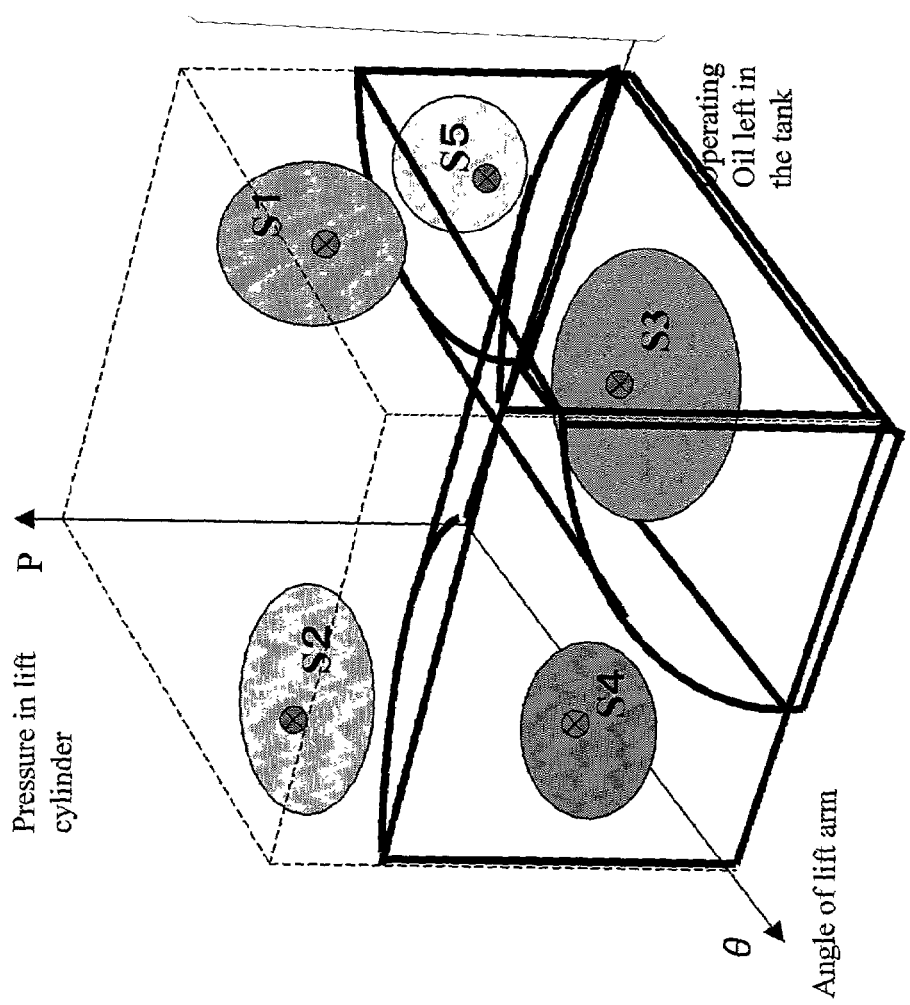
FIG. 18(A) and FIG. 18(B) illustrate the concept of state space for driving a bulldozer.
Figure 18:
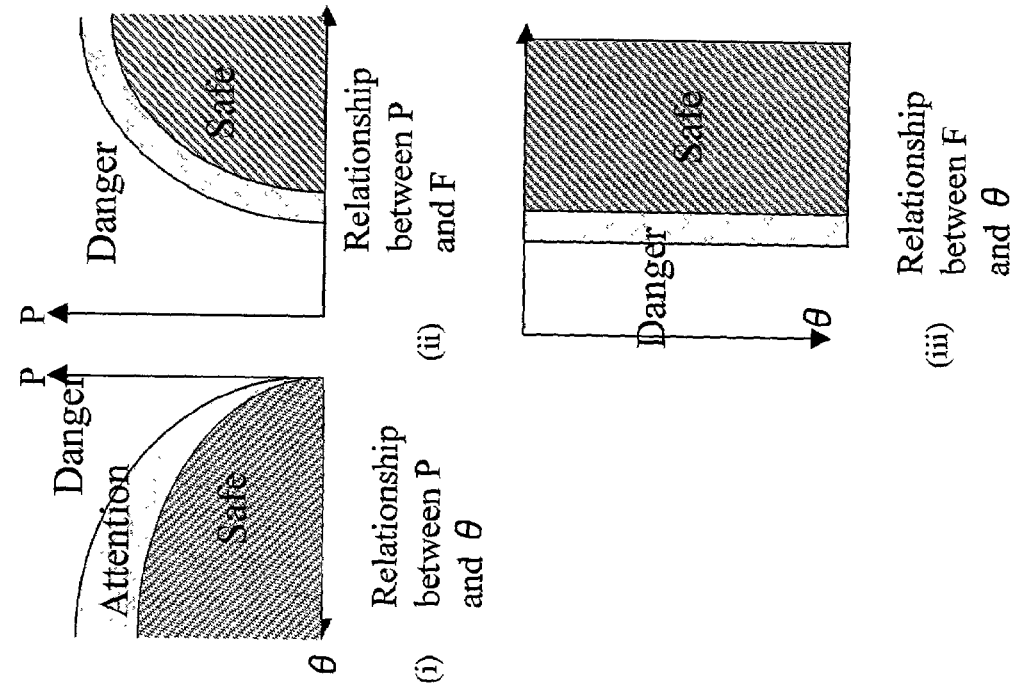

FIG. 18(A) shows the relationship among three variables. P is the pressure detected by the pressure sensor on the lift arm. $\theta$ is the angle detected by the angle sensor on the lift arm. F is the quantity of oil detected by the sensor in the operating oil tank. Figure (i), which gives the relationship between P and $\theta$, indicates that to insure stability and proper use, i.e., use which does not exert excessive force on the equipment, the load P to be lifted must be small when the angle $\theta$ between the lift arm and a horizontal surface is small (i.e., when the arm is close to horizontal). When angle $\theta$ is large (i.e., when the arm is upright), the lift load P may be large. Figure (ii), which gives the relationship between P and F, indicates that if the quantity of oil F is sufficient, the lift load P may be large. As the quantity of oil decreases, P must decrease. Even for a minimum load, approximately half the prescribed quantity of oil is needed. In Figure (iii), which shows the relationship between $\theta$ and F, we see that at least the prescribed quantity of oil is needed regardless of the angle.

FIG. 18(B) shows a state space in which the three sensor outputs in FIG. 18(A) are combined. State zone S3 in the state space represents the state of safe operation of the bulldozer. This is the zone in which the renter of the bulldozer is operating it properly. In other words, in the knowledge application system according to this invention, when the person is using the bulldozer in a state zone outside S3, he is given instructions to bring the use inside that zone. A person who uses the bulldozer inside this state zone will be regarded as an excellent customer and will be given a benefit such as a discounted rate in the future etc. We have created four typical state zones, S1, S2, S4 and S5, representing improper use. These zones, and state zone S3, the zone of proper use, are as follows.

S1: Name of state: Insufficient operating oil+Operator error
When there is too little operating oil, the pressure in the lift cylinder will get too high. The lift arm will not go up as much as it should, and a large load will be imposed on the angle cylinder.

S2: Name of state: No operating oil+Operator error
Because there is virtually no operating oil, the lift arm cannot be used. The lift arm doesn't go up high enough to lift the load.

S3: Name of state: Safe operation
Explanation: Bulldozer is operating in the proper state.

S4: Name of state: Insufficient operating oil
The lift arm is operating even though there is insufficient operating oil. There is a possibility that air will get into the cylinder.

S5: Name of state: Error operating lift arm
The operator tries to lift something heavy with the blade but without raising the lift arm. The load on the angling cylinder is too great.

3.1.3. A State Route Map to Operate a Bulldozer

Figure 19:
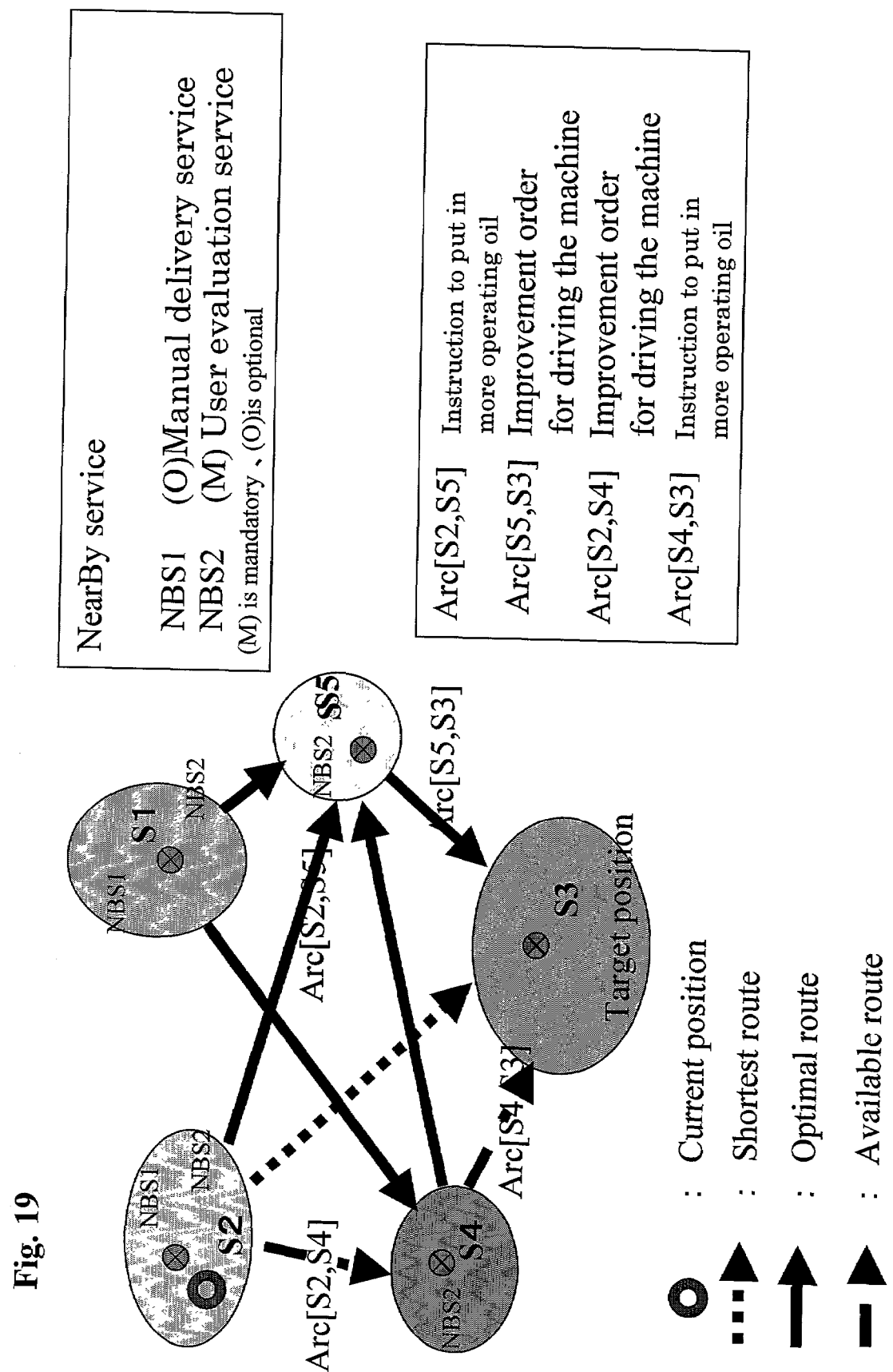
FIG. 19 illustrates a state route map of the arcs, i.e., the actions which must be executed, to go between state zones S1 through S5, the typical operating states shown in FIG. 18(B).

FIG. 19 is a state route map of the arcs, i.e., the actions which must be executed, to go between state zones S1 through S5, the typical operating states shown in FIG. 18(B). In this example, we assume that the output from the sensors indicates that the driver of the bulldozer is treating it in such a way that it is about to enter state zone S2. In S2, as we have discussed, the bulldozer is almost out of operating oil and the lift arm cannot be used. It will not go up enough to lift the load. In this case, if there were a direct arc [S2, S3] from S2 to destination state zone S3, it would be executed as the shortest route. However, let us assume that this knowledge application system lacks experiential data to suggest this. There are thus two arcs leading from S2 to S3: Arc [S2, S5], by which the driver is instructed to put in more operating oil, plus Arc [S5, S3], by which he is asked to improve the way he is operating the bulldozer; or Arc [S2, S4], by which he is asked to improve the way he is operating the bulldozer, plus Arc [S4, S3], by which he is instructed to put in more operating oil. In this case, the state space navigator in the knowledge application device according to this invention will select the optimal arc by using a predetermined route evaluation function to choose the optimal route. Here it is determined that the optimal route is the arc which goes from the current state zone, S2 (Low operating oil+Operator error), first by adding operating oil, to state zone S5 (Operator error). The driver then changes the way he is operating the bulldozer and we reach state S3 (Safe operation). It would also be possible to change the way the driver is operating the bulldozer without adding oil and so move into state zone S4 (Low operating oil), and from there add more oil; however, when the bulldozer is operated without sufficient oil, there is a danger that air bubbles might develop in the cylinder oil, a situation which should be avoided. The messages entailed by the selected arcs, Arc [S2, S5] ("Add operating oil") and Arc [S5, S3] ("Please operate more carefully") are displayed on screen 1061 (a CRT etc.) of the terminal control device 1060 shown in FIG. 10, which is in the cab of the bulldozer.

3.1.4. The Nearby Service

In this model for discounting the rate for rental equipment, as an alternative to instructing the driver directly, as discussed above, there are two possible Nearby services. They are (1) an optional manual delivery service and (2) a mandatory user evaluation service. In each state zone shown in FIG. 19, NBS1 is set up as a manual delivery service and NBS2 as a user evaluation service. When the knowledge device detects operator error in S1 and S2, he is given a manual to help him correct his errors. Whenever the current state of the bulldozer enters a state zone other than S3 (Safe operation), it is being operated improperly. The operator is evaluated, and he is apprised of the faults which lowered his score. An operator with few faults will be considered an excellent customer and will receive a discount. Below we explain the procedures for services.

3.1.4.1. Delivering a Manual

Figure 20:
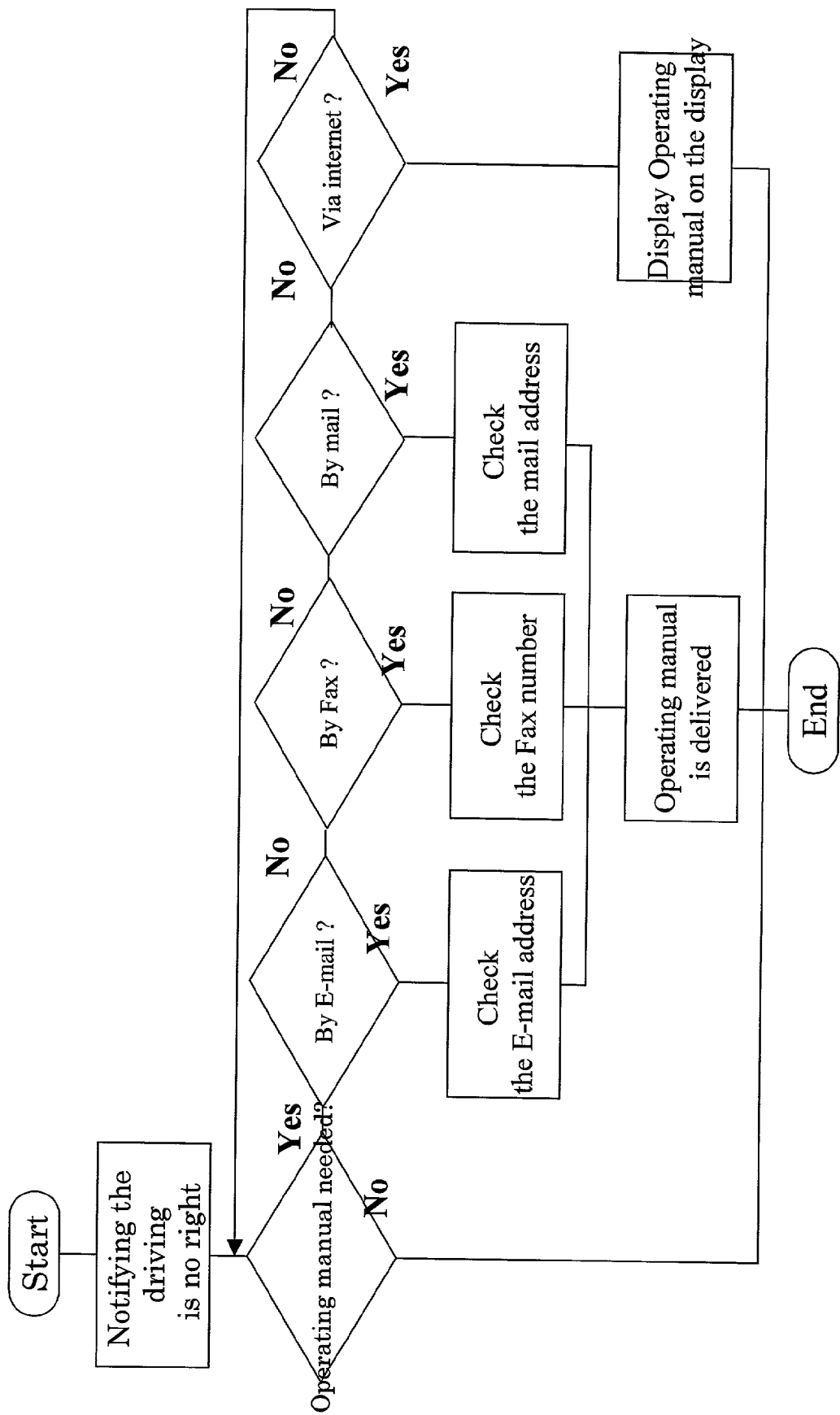
FIG. 20 illustrates a flow chart of the manual delivery service for renting a bulldozer.

As can be seen in FIG. 19, when it is determined that a bulldozer using the knowledge application system according to this invention has entered state zones S1 or S2, the first thing that is done, as can be seen in FIG. 20, is to inform the operator that there is something wrong with the way he is operating the bulldozer. This is done visually, as was discussed above, by displaying a message on screen 1061 shown in FIG. 10. Then, if this option is chosen, the operator is sent an operating manual so that he will understand how to operate the bulldozer properly. As can be seen in FIG. 20, the manual may be sent to the operator by whatever means the user prefers: E-mail, fax, regular mail or the Internet. In this way we can make it more probable than it was in the past that the operator will treat the bulldozer he has rented in the proper way. As a result, the rental company accrues a great benefit. The manual provided may be either the entire manual for the system or only the excerpt needed for that state.

3.1.4.2. Evaluating the Operator

Figure 21:
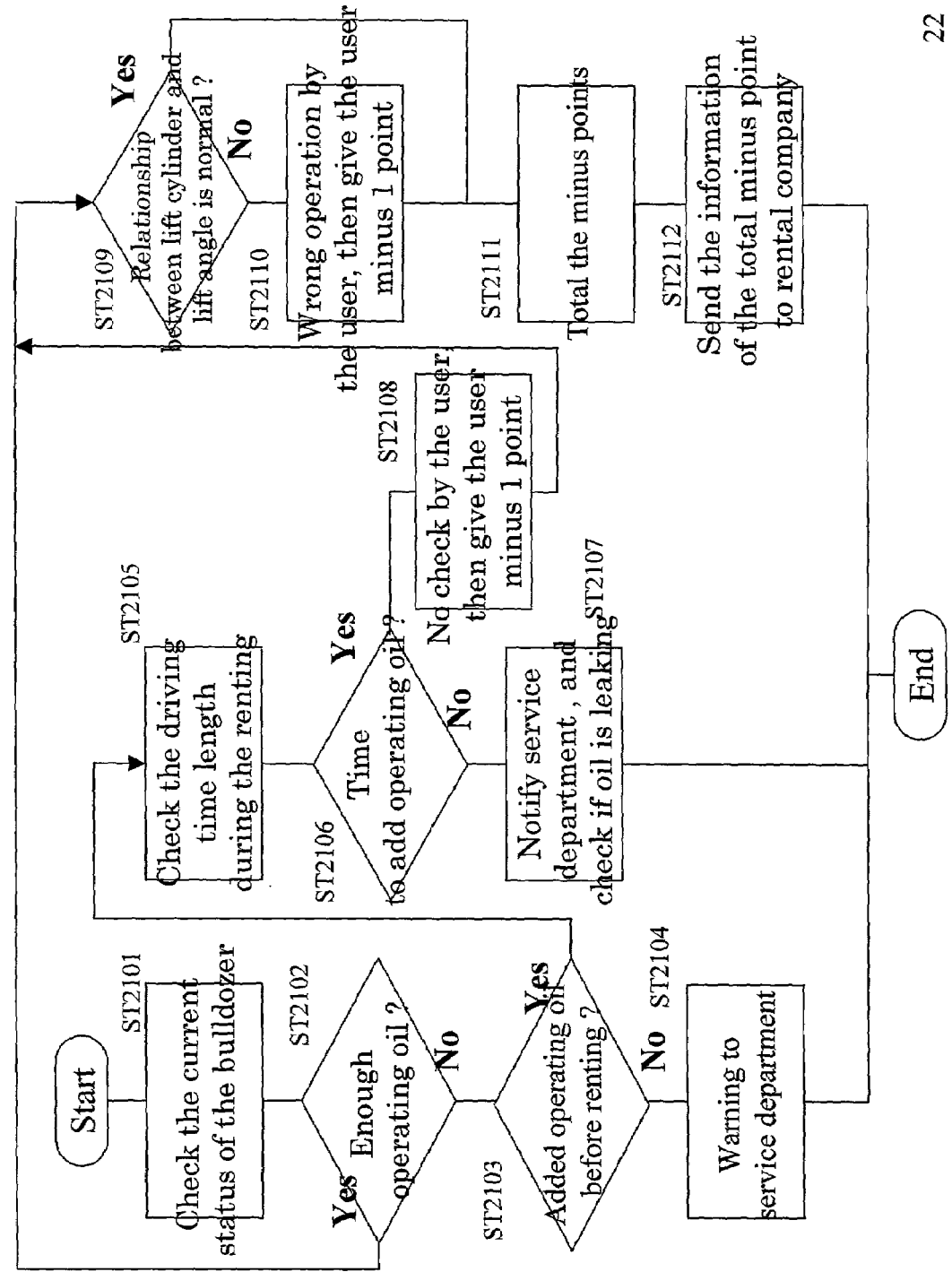
FIG. 21 illustrates a flow chart of the actual procedure of operator evaluating service.

FIG. 21 is a flow chart of the actual procedure used to evaluate the operator (shown as NBS2 in FIG. 19). The knowledge device detects, in Step 2101, that the bulldozer is in state zones S1, S2, S4 or S5 in FIG. 19. Since these all indicate that the bulldozer is in an abnormal state, the operator evaluation service kicks in. If in Steps 2102 through 2104 it is determined that the abnormality was due to negligence on the part of the rental company's service department, they are issued a warning. Similarly, in Steps 2105 through 2107, if the abnormality was due to negligence on the part of the rental company's maintenance department, they are contacted. However, if in Step 2105 an abnormality has occurred because it has become time to add oil, the operator loses one point in his evaluation, as adding oil is his responsibility. If in Step 2109 it is determined that the relationship between the lift cylinder and the angle of the lift arm is improper, we conclude that there is some problem in the way the operator is handling the bulldozer, and he loses a point.

Figure 22:
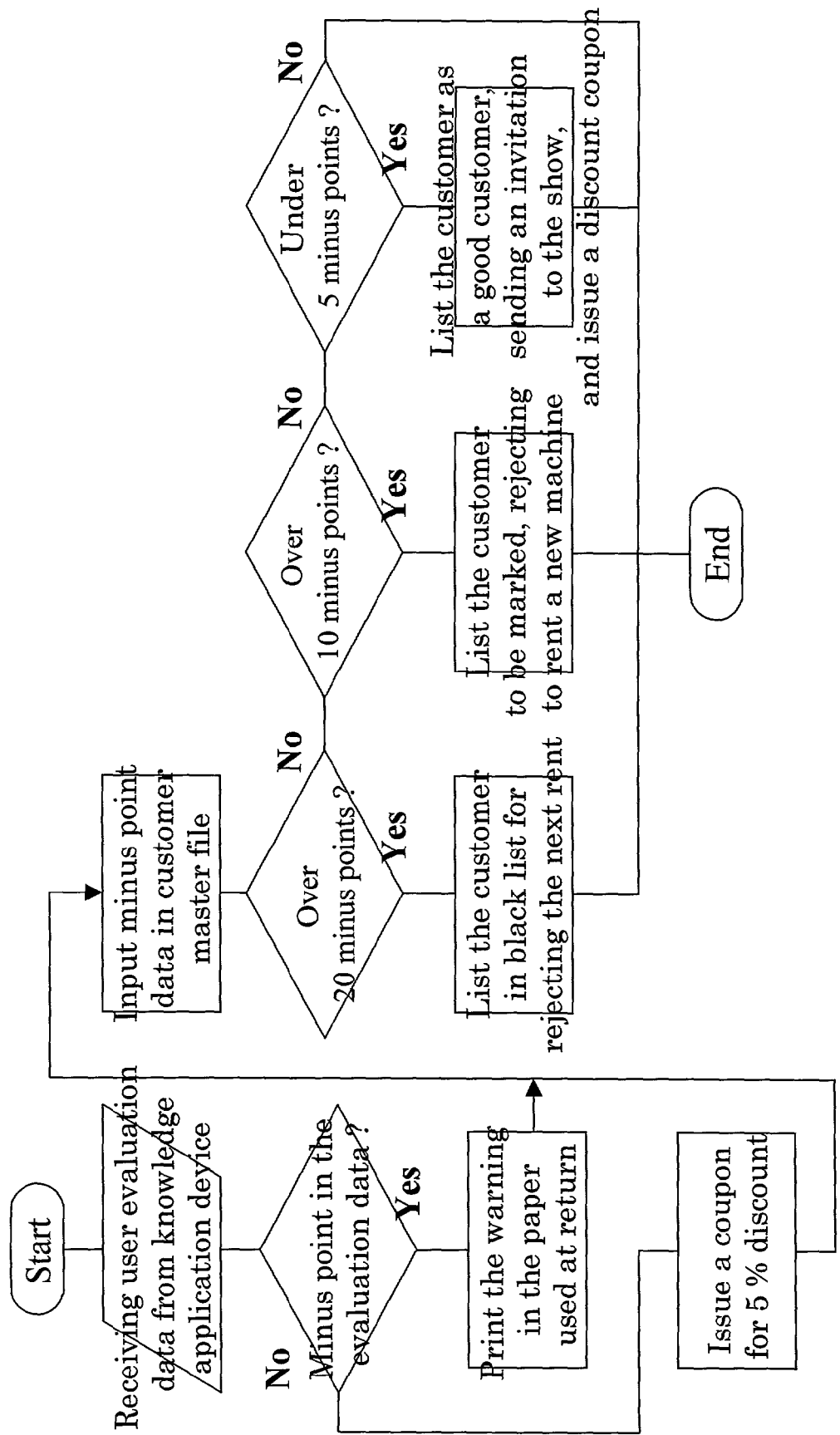
FIG. 22 illustrates a flow chart of the processing executed by the rental company.

FIG. 22 is a flow chart of the processing executed by the rental company. Each customer's values are totaled as described above and used, at regular intervals, to create a blacklist. Customers can then be sorted into different categories such as "do not rent to him," "needs to be watched; do not rent new equipment to him," or "excellent customer" or others.

3.2. A Business Model to Improve the Maintenance of Leased Equipment (Such as a Bulldozer)

3.2.1. Outline

The second business model employing the knowledge application system according to this invention is a model to improve the maintenance of leased equipment (such as a bulldozer). In the previous section we discussed a business model which could be used to select customers for rental equipment. The model entailed a knowledge application system in which a state space is constructed from state variables obtained by processing the output values from the sensors on the bulldozer, and this state space is used to select customers. However, the invention is not limited to this use only. We can consider the system to select customers to be a single subsystem. If we construct a state space using as state variables the evaluation scores obtained by the aforesaid customer selection system, we can provide advice or service that is more pertinent to management decisions.

3.2.2. State Zones Constructed to Improve Maintenance

Figure 23:
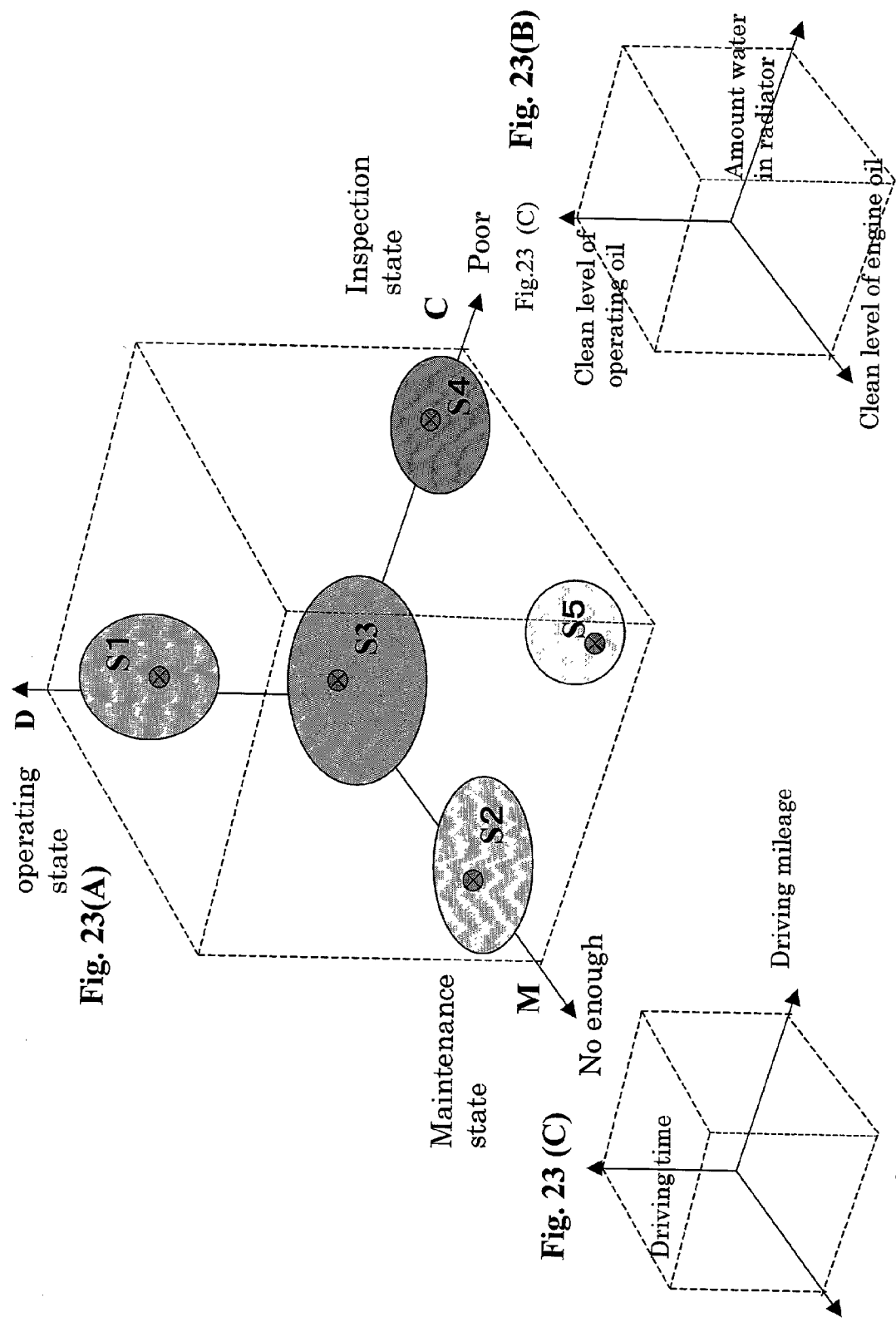
FIG. 23(A)-FIG. 23(C) illustrate more sophisticated concepts of the state space for leasing a bulldozer.

FIG. 23(A) shows a state space constructed for a business model to improve maintenance. The state variables do not consist of the raw output values of the sensors. The space consists of operating state D, inspection state C and maintenance state M. Operating state D is determined by the score the customer received in the aforesaid customer selection test. Inspection state C consists of the inspection evaluation values in the state space for user inspections in FIG. 23(B). Maintenance state M is determined by an evaluation score for maintenance given by an outside maintenance company, and shown in FIG. 23(C). In other words, the evaluation scores for three subsystems, operating, inspection and maintenance, are used as these three state variables.

The state space for user inspection shown in FIG. 23(B) is different from the aforesaid state space for customer selection. It consists of output values from the sensors which detect how clean the operating oil is, how clean the engine oil is, and how much water is in the radiator. The state space representing the state of maintenance performed by an outside maintenance company and shown in FIG. 23(C) consists of the output values from sensors which detect the operating time, the maximum pressure in the oil pump and the distance moved. From the evaluation scores for these three systems, operating, inspection and maintenance, we can create the representative state zones S1 through S5 shown in FIG.

23(A). This state space, then, consists of more sophisticated concepts than the spaces representing the subsystems. It can be used to make more administrative decisions.

State zones S1 through S5 represent the following states.

S1: Name of state: Problems in Manner of Operation

Although the daily inspections and periodic maintenance work are being done properly, there is a possibility that the equipment is being operated carelessly.

S2: Name of state: Insufficient periodic maintenance

The user is making the proper daily inspections and there are no problems in how he is driving; however, periodic maintenance by a specialist is insufficient.

S3: Name of state: Optimal maintenance, inspections and operation

Equipment is operated, inspected and maintained in the optimal state.

S4: Name of state: Insufficient daily inspections.

Periodic maintenance by a specialist is being performed properly and there are no problems in how the equipment is being operated; however, the daily spot checks are careless.

S5: Name of state: Inadequate spot checks and maintenance

There are no problems in how the equipment is being operated, but daily spot checks and periodic maintenance by a specialist are careless.

3.2.2. A State Route Map to Improve Maintenance

Figure 24:
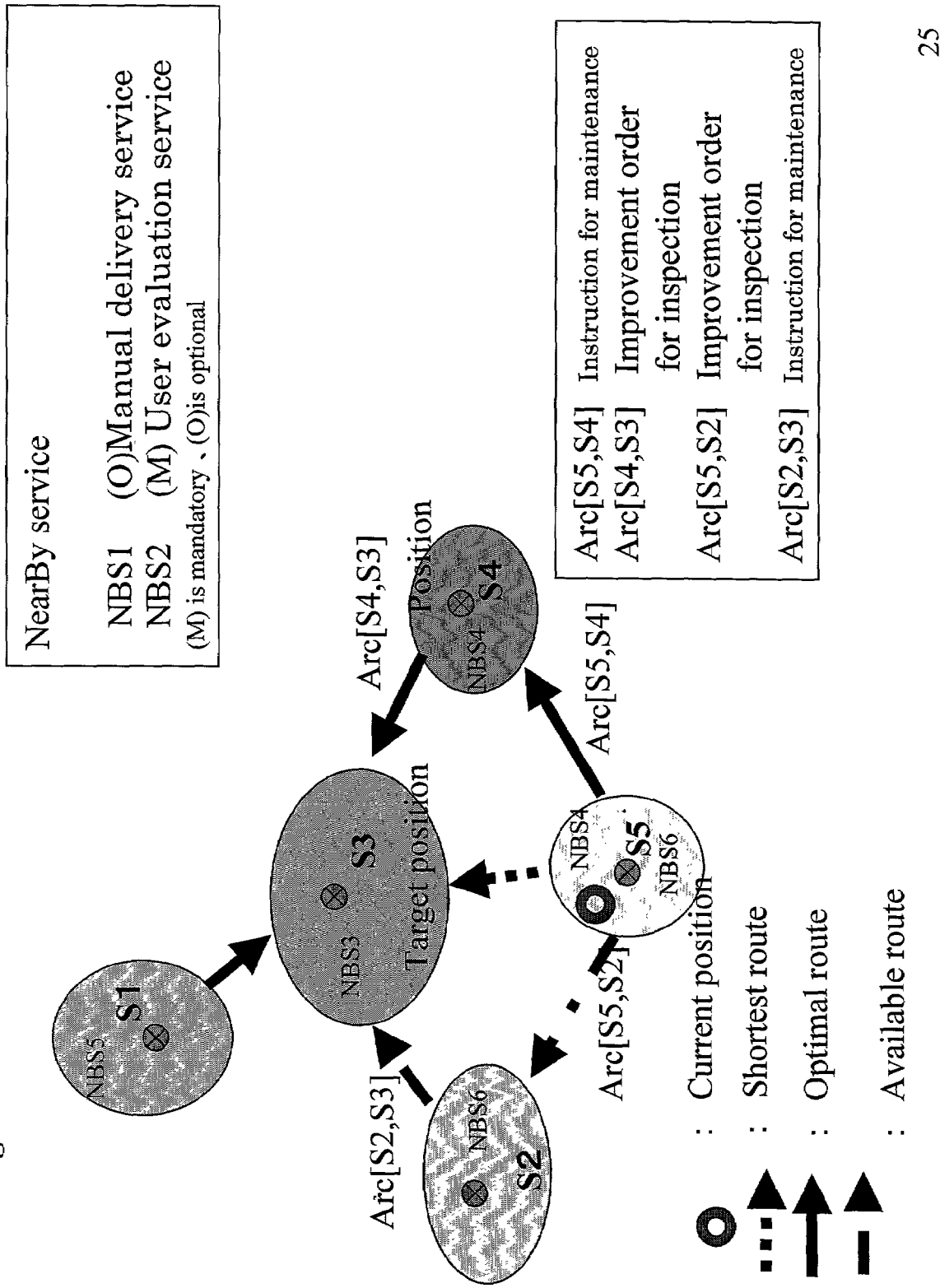
FIG. 24 illustrates a state route map to improve maintenance.

FIG. 24 shows a state route map to improve maintenance. State zones S1 through S5 can be navigated via four arcs. Arc [S5, S4] instructs the operator to perform maintenance; Arc [S4, S3] requests that spot checks be improved; Arc [S5, S2] requests that spot checks be improved; and Arc [S2, S3] instructs the operator to perform maintenance. Let us assume that the current position of the bulldozer is in S5. We wish to move from S5 to S3, which contains the destination. Here the shortest route would be Arc [S5, S3]; but there are no experiential data to construct this arc. It is thus determined that the optimal route is to go from the current state zone, S5 (Insufficient spot checks and maintenance), to state zone S4 (Inadequate daily spot checks) by having a mechanic perform the periodic maintenance, and then by improving the quality of the spot checks to reach S3 (the destination). It would not be impossible to improve the quality of the spot checks without having a mechanic do the periodic maintenance and so move to S2 (Inadequate periodic maintenance), and then start doing the periodic maintenance; however, if the daily inspections are done without performing the basic maintenance, the maintenance efficiency will remain low.

3.2.3. The Nearby Service

The following services, NBS3 through NBS6, can be provided in each zone as nearby services. These services are based on judgments that are closer to an administrative level.

NBS3: Identifying an Excellent Customer

The customer operates the equipment in a reasonable fashion, routinely performs the daily spot checks, and takes care of everything he is responsible for. He contacts a serviceman to perform the necessary periodic maintenance and keeps the equipment in optimal condition. The fact that he treats the equipment in a superior fashion will be communicated to the lease company and the insurance company. Based on an agreement it has made with the lease company, the insurance company discounts the rate for accident or damage insurance on the equipment maintained in excellent condition. If it reduces the leasing fee by the amount of the insurance discount, the lease company becomes able to give the customer a commission or discount his next leasing fee.

NBS4: Giving the Customer a Spot Check Manual

If the customer is not performing his initial and final spot checks properly, a manual explaining the proper way to do spot checks can be sent, if he wants it, to whatever address he prefers.

NBS5: Giving the Customer an Operating Manual

If the customer is not operating the equipment properly, an operating manual can be sent, if he wants it, to whatever address he prefers.

NBS6: Contacting the Serviceman

It can sometimes happen that there is poor communication between the serviceman and the person leasing the equipment, making it difficult to coordinate the maintenance schedule etc. This service notifies the serviceman when the state of the bulldozer's maintenance is poor and strongly urges the lessee to take action. The knowledge application device of this invention contacts the serviceman whenever the periodic maintenance is skipped, so the proper maintenance is always performed at the proper time. For the leasing company, this translates into a reduction in maintenance costs.

3.3. A Business Model to Verify Data Concerning the Condition of Used Equipment

3.3.1. Outline

The third business model employing the knowledge application device of this invention is a model to verify data concerning the condition of used equipment. In this business model, when equipment is being bought or rented, and in the disputes which sometimes occur at these times, the knowledge application system can function as a completely neutral third party with absolutely no interest. It can provide a history of how the equipment was used or produce detailed data for a user, a serviceman, a seller, a buyer, a rental company, a lease company, an insurance company or an assessment company etc.

3.3.2. State Zones for the Various States of Use

Figure 25:
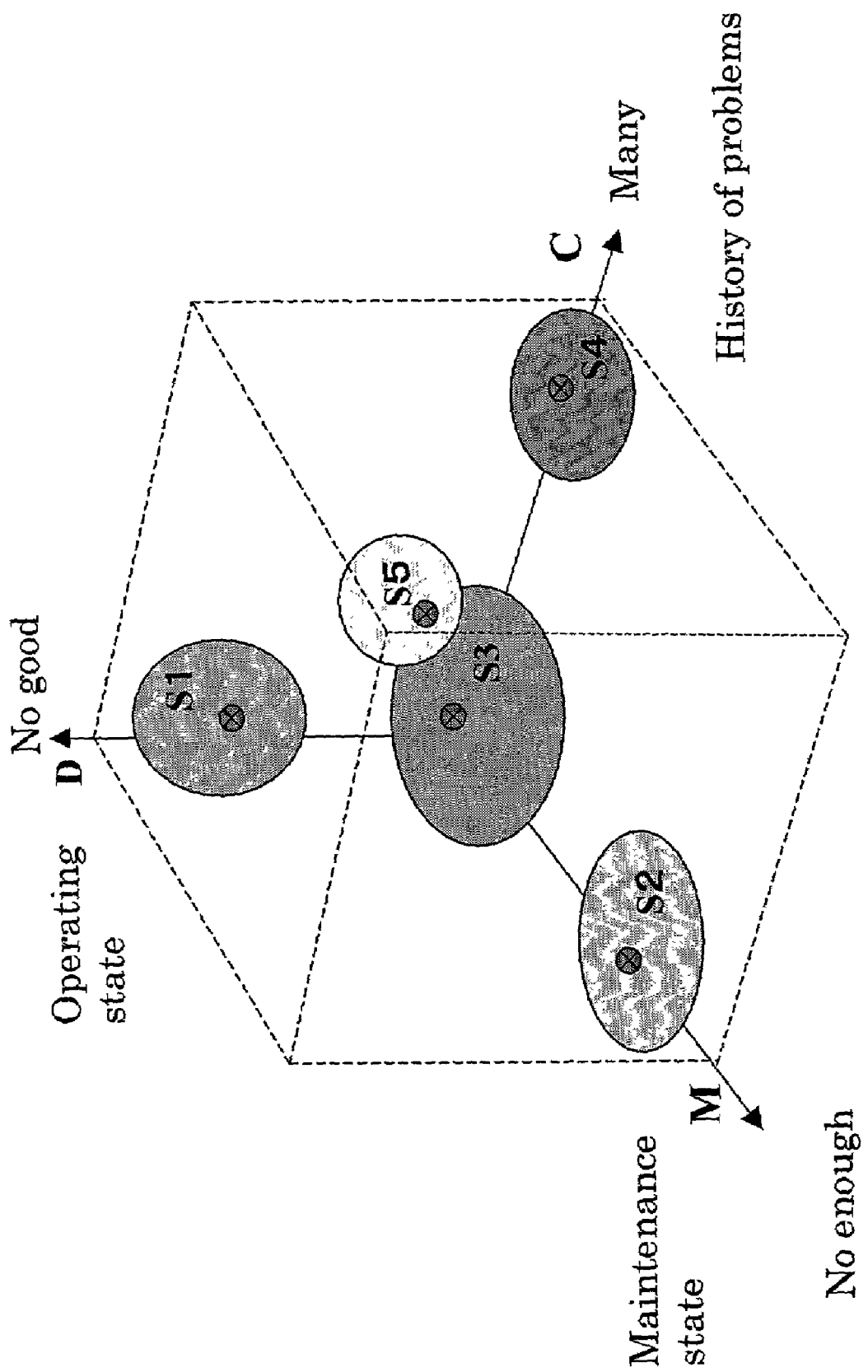
FIG. 25 illustrates the concept of the state space representing the usage state of a bulldozer, containing three state variables, operating state D, maintenance state M and history of problems C.

FIG. 25 represents the state of use of a bulldozer as a state space containing three state variables, operating state D, maintenance state M and history of problems C. Representative state zones S1 through S5 can be interpreted as the following states of use, which are used by a third party to objectively verify the data.

S1: Name of state: Problems in how the equipment is operated

Periodic maintenance has been performed properly, and there haven't been any accidents or breakdowns, but the bulldozer is being operated improperly.

S2: Name of state: Inadequate periodic maintenance

There haven't been any accidents or breakdowns, and there is no problem in how the bulldozer is operated, but the periodic maintenance is poor.

S3: Name of state: Optimal condition

The bulldozer is operated and maintained optimally, and there haven't been any accidents or breakdowns.

S4: Name of state: History of repeated problems

Periodic maintenance is performed properly and there are no problems in how the bulldozer is operated, but there have been accidents or breakdowns, or the total operating time is long.

S5: Name of state: Resale value is low

Bulldozer was used and maintained improperly, and it has a history of accidents and breakdowns.

Data representing the state of use can be provided as the three-dimensional totals of evaluation points shown in FIG. 25. Alternatively, if desired, they can be provided in the form of state variables analyzed into grades, each on its own axis, as in FIGS. 23(B) and (C). This is analogous to a centrally located post office which furnishes proof of the content of letters. The service of verifying data concerning the bulldozer's state of use has the following advantages.

1) It is easier to assess the equipment when it is to be resold, and the assessment will better reflect the real state of the equipment.

2) The buyer knows the actual history of the equipment's use, so he doesn't have to worry about whether it was in an accident etc. If the equipment has a history which includes accidents or breakdowns, the buyer can obtain it at a low price.

3) The seller can ask the maximum price consonant with the equipment's condition at resale.

4) If the equipment is involved in an accident which results in personal injury or damage to property, and operator error is involved, the manufacturer of the equipment or the leasing or rental company can provide data as evidence and so reduce the cost of litigation. At present some companies have insurance to cover the cost of litigation. In the future, the use of the knowledge application system according to this invention will very likely result in the insurance premiums being reduced.

4. Effects of the Invention

The knowledge application device according to this invention employs a sensing model to convert knowledge data transmitted by the user's system into universal state variables which represent the state of the device but do not depend on how the data were accumulated. This allows a universal remote monitoring system to be constructed which can monitor the state of the user's system from any location.

With the help of the knowledge application device, equipment which could not be automatically controlled can easily be upgraded to auto-control equipment. A person who buys a given system can, simply by entering the model number into his control terminal, can easily make use of knowledge contributed by someone who successfully upgraded that same system. The knowledge data can now be made use of, and the knowledge itself can now be treated as a product.

Through the knowledge application device, the customer can order and purchase the products he needs to improve his system. When he has obtained all the components he needs to upgrade his system, he again enters the model number of his system into his terminal. He then obtains from the knowledge application device information on how to install the components on his rice cooker and how to connect them to his control terminal. These instructions are displayed on the screen of his control terminal.

With the knowledge application device of this invention, when the user's system enters a given state, it can obtain a service related to that state as a Nearby function. The customer receives the service, the service provider gets more business, and the person managing the knowledge application system receives a fee for keeping the service provider's name on file etc. The invention thus creates many new business opportunities.

If this invention is used as a business model to select customers for rental equipment, individuals who are determined to be excellent customers can receive benefits such as rental discounts etc.

If this invention is used as a business model to improve the maintenance of leased equipment, the condition of the leased equipment can easily be ascertained, and data can be obtained about all aspects of maintenance from a sophisticated state space.

If this invention is used as a business model to verify data concerning the condition of equipment to be resold, objective, third-party data concerning the actual state of the equipment can be provided for a fee. The invention thus creates opportunities for new businesses to develop.

What is claimed is:

1. A knowledge application system comprising:
   a user's system; and
   a knowledge application device,
   wherein the knowledge application system is configured to change a current state of said user's system to a target state based on a knowledge data base,
   said user's system comprising:
      a user's sensor unit configured to detect an electrical sensing signal, the electrical sensing signal being an output of said user's system, the electrical sensing signal being an input to said knowledge application device;
      a conversion unit configured to convert the detected electrical sensing signal by said user's sensor unit into a universal state variable which is compatible with a reference output data detected by a reference sensor unit used in said knowledge data base;
      a comparison unit configured to compare said universal state variable representing said current state with said reference output data detected by said reference sensor unit used in said knowledge data base; and
      a user state changing unit configured to change said current state of said user's system to said target state based on an output of said comparison unit,
   said knowledge application device comprising:
      a receiving means to receive a request from said user's system, and predetermined information to identify said user's system via a communication network;
      a state route map memory means to store a plurality of state route maps in said knowledge data base;
      a state route map reading means to read a specific state route map based on said received predetermined information to identify said user's system, and store said specific state route map in a buffer area;
      an access information memory means to store address information of said user's sensor unit which outputs a state variable, and sensing model identification information to identify a sensing model which modifies said state variable of said detected sensing signal from said user's sensor unit, said address information of said user's sensor unit and sensing model identification information being defined based on said received predetermined information to identify said user's system;
      a sensing model memory means to store a plurality of sensing models in said knowledge data base, said sensing models corresponding to a sensing model identification information;
      an information reading means to read said sensing model identification information, and said address information of said user's sensor unit based on said predetermined information to identify said user's system;
      a sensing model reading means to read said sensing model based on said sensing model identification information;
      a state variable generating means to read said detected sensing signal by said user's sensor unit defined by said address information, and generate said universal state variable which represents said current state of said user's system;

a state space navigator which determines series of actions according to said request from said user's system based on said universal state variable and said state route map stored in said buffer area; and an action output means to output a series of actions which are determined by said state space navigator, wherein said target state corresponds to a desired state of said user's system as determined by a user of said user's system, and wherein an actual selection of said user's sensor unit installed in said user's system and an actuator to perform said series of actions which are determined by said state space navigator, is determined by a Web software installed in said knowledge application device according to input specifications of said sensor and said actuator which are required for said user system.

2. A knowledge application system comprising:

a user's system; and a knowledge application device, wherein the knowledge application system is configured to change a current state of said user's system to a target state based on a knowledge data base, said user's system comprising:

a user's sensor unit configured to detect an electrical sensing signal, the electrical sensing signal being an output of said user's system, the electrical sensing signal being an input to said knowledge application device;

a conversion unit configured to convert the detected electrical sensing signal by said user's sensor unit into a universal state variable which is compatible with a reference output data detected by a reference sensor unit used in said knowledge data base;

a comparison unit configured to compare said universal state variable representing said current state with said reference output data detected by said reference sensor unit used in said knowledge data base; and a user state changing unit configured to change said current state of said user's system to said target state based on an output of said comparison unit, said knowledge application device comprising:

a receiving means to receive a request from said user's system, and predetermined information to identify said user's system via a communication network;

a state route map memory means to store a plurality of state route maps in said knowledge data base;

a state route map reading means to read a specific state route map based on said received predetermined information to identify said user's system, and store said specific state route map in a buffer area;

an access information memory means to store address information of said user's sensor unit which outputs a state variable, and sensing model identification information to identify a sensing model which modifies said state variable of said detected sensing signal from said user's sensor unit, said address information of said user's sensor unit and sensing model identification information being defined based on said received predetermined information to identify said user's system;

a sensing model memory means to store a plurality of sensing models in said knowledge data base, said sensing models corresponding to a sensing model identification information;

an information reading means to read said sensing model identification information, and said address information of said user's sensor unit based on said predetermined information to identify said user's system;

a sensing model reading means to read said sensing model based on said sensing model identification information;

a state variable generating means to read said detected sensing signal by said user's sensor unit defined by said address information, and generate said universal state variable which represents said current state of said user's system;

a state space navigator which determines series of actions according to said request from said user's system based on said universal state variable and said state route map stored in said buffer area; and an action output means to output a series of actions which are determined by said state space navigator, wherein said target state corresponds to a desired state of said user's system as determined by a user of said user's system, wherein an actual installation method of said user's sensor unit installed in said user's system and an actuator to perform said series of actions which are determined by said state space navigator, is displayed on a display monitor in said user system, and wherein said system is equipped with a direct communication function to receive an actual installation image of said sensor unit and said actuator in said user system, said image is captured by a camera unit installed in said user system, and said direct communication function is capable of communicating manually with said user system for sending an instruction from said device.

3. A knowledge application device to change the current state of a user's system to a target state based on a knowledge data base, the device comprising:

a receiving unit configured to receive an electrical sensing signal corresponding to an output of said user's system, the electrical sensing signal being an input to said knowledge application device;

a conversion unit configured to convert the detected electrical sensing signal by said user's sensor unit into a universal state variable which is compatible with a reference output data detected by a reference sensor unit used in said knowledge data base;

a comparison unit configured to compare said universal state variable representing said current state with said reference output data detected by said reference sensor unit used in said knowledge data base; and a user state changing unit configured to change said current state of said user's system to said target state based on an output of said comparison unit;

wherein said target state corresponds to a desired state of said user's system as determined by a user of said user's system, and wherein said user's system corresponds to a cooking device, and wherein said electrical sensing signal corresponds to at least one of a temperature within said cooking device and a pressure within said cooking device.

4. A knowledge application device to change a current state of a user's system to a target state based on a registered knowledge data base using a sensing signal detected by a user's sensor unit installed in said user's system, wherein said detected sensing signal by said user's sensor unit is converted into a universal state variable which is compatible with a reference output data detected by a reference sensor unit used in said registered knowledge data base, and said universal state variable representing said current state is compared with said reference output data detected by said reference sensor unit used in said knowledge data base for changing said current state of said user's system to said target state, said knowledge application device, comprising:

a knowledge data base equipped with a state route map memory means to store a state route map which defines how to change a plurality of states between said current state to said target state, each change being indicated by an arc which connects two states between said current state to said target state;

a state space navigator, comprising:

an arc estimation means to extract an attribute of each arc in said state route map which defines each change of states, and calculates an estimation value of said extracted attribute of each arc;

a route estimation means to select a plurality of routes starting from a current state zone of said current state to a target state zone of said target state, and calculate each total estimation value of said plurality of routes;

an optimal route search means to compare each total estimation value of said selected plurality of routes selected by said route estimation means, and search an optimal route; and an actuator to execute a series of actions specified in a series of arcs defined in said optimal route searched by said state space navigator.

5. The knowledge application device according to claim 4, further comprising means to execute a predetermined service or action in a specific state zone before reaching the said target state zone, or notification of specific information to a user of said user's system.

6. The knowledge application device according to claim 4, further comprising a nearby function to execute a predetermined service or action at a neighbor space of said selected optimal route before reaching the said target state zone, or notification of specific information to a user of said user's system.

7. The knowledge application device according to claim 4, wherein an actual selection of said user's sensor unit installed in said user's system and an actuator to perform said series of actions which are determined by said state space navigator, is determined by Web software installed in said knowledge application device according to input specifications of said user's sensor unit and said actuator which are required for said user system.

8. The knowledge application device according to claim 4, wherein an actual installation method of said user's sensor unit installed in said user's system, and an actuator to perform said series of actions which are determined by said state space navigator, is displayed on a display monitor in said user system.

9. The knowledge application device according to claim 8, wherein said device is equipped with a direct communication function to receive an actual installation image of said sensor unit and said actuator in said user system, said image is captured by a camera unit installed in said user system, and said direct communication function is capable of communicating manually with said user system for sending an instruction from said device.

10. A state space navigator of a series of actions specified in a series of arcs defined in an optimal route, said series of arcs being directed from a current state zone representing a current state of a user's system to a target state zone representing a target state, said state space navigator being used in a knowledge application device according to claim 4, to change said current state of said user's system to said target state based on a registered knowledge data base using a sensing signal detected by a user's sensor unit installed in said user's system, said state space navigator comprising:

a state variable reading means to read one or more state variables representing said current state of said user's system periodically or on demand;

a state zone reading means to read a plurality of state zones in a state space used for said user's system, said plurality of state zones being stored in a state zone memory means;

a service action reading means to read a service action to be executed in each state zone;

a state zone detecting means to detect a current state zone having a current state position identified by said read state variables out of said plurality of read state zones; and a service action control means to control said service action if said service action reading means reads executable service action in said current state zone.

11. A terminal control device which is an input/output means installed in a user system, and used for operating said user system by re-using a knowledge data stored in a knowledge application device according to claim 4, which is connected to the Internet, wherein said terminal control device is used for installing and adjusting a user's sensor unit and an actuator in said user system.

12. A rental or lease rate adjusting method to adjust a rental or lease rate of an equipment or device, which calculates said rental or lease rate according to an actual usage data of said equipment or device, said actual usage data being obtained from a sensor signal of a sensor unit installed in said equipment or device, and a knowledge application device according to claim 4, which is connected to said equipment or device via the Internet.

13. A remote maintenance method to determine a maintenance of an equipment or device, which determines a necessary maintenance for said equipment or device according to an actual usage data of said equipment or device, said actual usage data being obtained from a sensor signal of a sensor unit installed in said equipment or device, and a knowledge application device according to claim 4, which is connected to said equipment or device via the Internet.

14. A verifying method to verify data concerning a condition of used equipment or device, which verifies an actual usage data of said used equipment or device, said actual usage data being obtained from a sensor signal of a sensor unit installed in said equipment or device, and a knowledge application device according to claim 4, which is connected to said equipment or device via the Internet.

* * * * *